US007692661B2

(12) United States Patent
Cook et al.

(10) Patent No.: US 7,692,661 B2
(45) Date of Patent: *Apr. 6, 2010

(54) METHOD OF CREATING AND EVALUATING BANDLIMITED NOISE FOR COMPUTER GRAPHICS

(75) Inventors: Rob Cook, San Anselmo, CA (US); Tony DeRose, San Rafael, CA (US)

(73) Assignee: Pixar, Emeryville, CA (US)

( * ) Notice: Subject to any disclaimer, the term of this patent is extended or adjusted under 35 U.S.C. 154(b) by 1015 days.

This patent is subject to a terminal disclaimer.

(21) Appl. No.: 11/342,349

(22) Filed: Jan. 26, 2006

(65) Prior Publication Data

US 2006/0164428 A1 Jul. 27, 2006

Related U.S. Application Data

(60) Provisional application No. 60/647,726, filed on Jan. 26, 2005, provisional application No. 60/675,932, filed on Apr. 21, 2005.

(51) Int. Cl.
*G09G 5/00* (2006.01)
(52) U.S. Cl. ...................................... 345/582
(58) Field of Classification Search ........................ None
See application file for complete search history.

(56) References Cited

U.S. PATENT DOCUMENTS 5,832,136 A * 11/1998 Hirose ........................ 382/275
5,883,979 A * 3/1999 Beretta et al. ............... 382/251

OTHER PUBLICATIONS

Luiz Velho, Procedural Shape Synthesis on Subdivision Surfaces, 2001 IEEE, pp. 146-153.*
Ivan Selesnick, Balanced Multiwavelet Bases on Symmetric FIR Filters, Jan. 2000, IEEE.*
Sanjit K. Mitra, Digital Signal Processing: A Computer-Based Approach $2^{nd}$ Edition, Jul. 16, 2001, pp. 696-698.*

* cited by examiner

*Primary Examiner*—Bhavesh M Mehta
*Assistant Examiner*—Alex Liew
(74) *Attorney, Agent, or Firm*—Law Office of Jonathan Hollander PC

(57) ABSTRACT

Function spaces defined by scaling functions are used to generate bandlimited noise octaves and other attribute data sets. Scaling functions are basis functions that admit multiresolution analysis and include piecewise constant scaling functions, piecewise polynomial scaling functions, bandlimited scaling functions, Daubeschies scaling functions, as well as other multiresolution analysis scaling basis functions known to those of skill in the art. Scaling basis functions can be locally supported or have infinite support. The properties of the scaling basis functions used to construct bandlimited noise octaves may ensure that any bandlimited noise octave at resolution level N is orthogonal to bandlimited noise octaves and their associated scaling basis functions at all resolution levels less than N. Bandlimited noise octaves can be scaled to any resolution level and guaranteed to have no effect on images at any lower resolution level.

18 Claims, 20 Drawing Sheets

METHOD OF CREATING AND EVALUATING BANDLIMITED NOISE FOR COMPUTER GRAPHICS

CROSS-REFERENCES TO RELATED APPLICATIONS

This application claims priority to U.S. Provisional Patent Applications Nos. 60/647,726, filed Jan. 26, 2005, and 60/675,932, filed Apr. 21, 2005, the disclosures of which are incorporated by reference herein for all purposes.

BACKGROUND OF THE INVENTION

The present invention relates to the field of computer graphics, and in particular to methods and apparatus for animating computer generated characters. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

One important aspect in creating realistic looking rendered images is the creation of attributes for the surfaces and optionally the interiors of objects. Optical attributes can include color; transparency; reflective and refractive properties (such as diffuse and specular reflective coefficients; and geometric properties (such as surface normal and displacement vectors). Attributes often vary in complex ways over the surface or space defined by an object. To model these changes, one or more data sets defining all or a portion of an object's attributes are defined and mapped onto the surfaces and/or volume of an object. Data sets may have one, two, three, or more dimensions. For example, a texture map is a data set defining the color of the surfaces and/or volume of an object. Texture maps can be used to give objects the appearance of different materials. For example, a wood texture or a marble texture can be applied to an object to give it the appearance of being made of wood or marble, respectively.

Attribute data sets can be generated in a number of ways. An artist can manually create data sets such as texture maps by drawing an image of the desired data set. Other software tools can be used to manually define other types of attribute data sets, such as surface normal or displacement vectors. Additionally, data sets can be generated procedurally. Typically, procedural data sets are created by applying one or more algorithms to one or more input data sets. In some applications, only the algorithms and input data sets for a procedural data set are defined in advance of rendering. During rendering, the procedural data is produced as needed for only the portions of objects being rendered. Procedural data sets can be used to approximate the attributes of a variety of different materials, such as wood, stone, glass, smoke, fire, and fur.

One type of input data often used by procedural data sets is noise. Noise is a set of random, pseudorandom, or other type of data without any discernable pattern. Data having a discernable pattern may also have a noise component, which is the portion of the data without a discernable pattern. Noise is used by procedural data sets to introduce natural variations in the attributes of an object and to ensure that no unnatural repeating patterns occur. One common type of noise used by procedural data sets is Perlin noise. Perlin noise creates a noise set by combining two or more octaves of random or pseudorandomly generated data. An octave is a set of data having a frequency spectrum contained between two frequencies that have a two to one ratio. By combining octaves of data, Perlin noise attempts to bandlimit the resulting noise to a desired frequency spectrum.

Aliasing due to undersampling high frequency data is one problem that arises during rendering. Rendering is analogous to sampling the data of a scene, with each pixel or sub-pixel representing a sample. The distance between pixels determines the maximum spatial bandwidth for a given rendering resolution. If the scene contains data, including attribute data sets, having high frequency components exceeding the maximum spatial bandwidth of the renderer, aliasing can occur.

One problem with Perlin noise is that it is poorly bandlimited. Although Perlin noise is created from separate noise octaves, each octave often includes frequency components outside the desired range of frequencies of the octave. As a result, rendering procedural data sets created from Perlin noise can result in portions that have aliasing artifacts due to undersampling of excess high frequency components or blurring due to excess low frequency components. For scenes with surfaces sampled at a variety of different frequency ranges, for example a ground surface extending from the foreground to the horizon, the user must often choose between including additional octaves and introducing aliasing as a result, or excluding these additional octaves and introducing blurring or loss of detail.

It is therefore desirable for a system and method to create bandlimited noise data for procedural data sets and other purposes. It is further desirable to provide greater control over the distribution and appearance of combinations of noise octaves. It is also desirable to be able to seamlessly combine attribute data sets having any arbitrary sizes and frequency spectrums and to efficiently filter the combined results to prevent aliasing, blurring, and other unwanted visual artifacts.

BRIEF SUMMARY OF THE INVENTION

An embodiment of the invention uses function spaces generated by scaling functions to generate bandlimited noise octaves and other attribute data sets. Scaling functions are basis functions that admit multiresolution analysis and include piecewise constant scaling functions, such as Haar basis functions; piecewise polynomial scaling functions, such as uniform B-spline basis functions of any degree; bandlimited scaling functions, such as sinc functions; Daubeschies scaling functions, as well as other multiresolution analysis scaling basis functions known to those of skill in the art. Scaling basis functions can be locally supported, allowing for noise data to be constructed using a small number of noise coefficients, or have infinite support.

In an embodiment, the properties of the scaling basis functions used to construct bandlimited noise octaves may ensure that any bandlimited noise octave at resolution level N is orthogonal to bandlimited noise octaves and their associated scaling basis functions at all resolution levels less than N, such as resolution levels N-1, N-2, and so forth. This is true regardless of whether the scaling basis functions at different resolution levels are orthogonal to each other, such as Haar scaling basis functions, or not orthogonal to each other, such as B-spline scaling basis functions. Moreover, an embodiment of the bandlimited noise octaves can be scaled to any resolution level and guaranteed to have no effect on images at any lower resolution level.

In an embodiment, a method of creating a bandlimited data set for use in creating at least one computer graphics image includes receiving an unfiltered data set. The unfiltered data set has a first frequency spectrum that includes a first maximum frequency. An embodiment of the method transforming the unfiltered data set into a filtered data set. The filtered data set has a second frequency spectrum. The second frequency spectrum includes a second maximum frequency that is less than the first maximum frequency. An embodiment of the method processes the filtered data set and the unfiltered data set to define a first bandlimited data set having a frequency spectrum substantially between the first maximum frequency and the second maximum frequency and combines the first bandlimited data set with a second bandlimited data set having a frequency spectrum substantially between a third frequency and a fourth frequency to form the data set.

In an embodiment, the first bandlimited data set is defined by coefficients of a set of locally supported scaling basis functions. The set of locally supported scaling basis functions may include a piecewise polynomial scaling basis function or a piecewise constant scaling basis function.

In an embodiment, processing the filtered data set and the unfiltered data set includes converting the filtered data set and the unfiltered data set to a common resolution and subtracting each element of the converted filtered data set from its corresponding element in the converted unfiltered data set. In a further embodiment, converting the filtered data set and unfiltered data set includes upsampling the filtered data set to a resolution of the unfiltered data set.

In another embodiment, transforming the unfiltered data set into the filtered data set includes transforming the unfiltered data set to determine detail coefficients that represent a portion of the unfiltered data set that cannot be represented by the filtered data set. In this embodiment, processing the filtered data set and the unfiltered data set to define a first bandlimited data set includes inverse transforming of the detail coefficients.

In an embodiment, receiving an unfiltered data set comprises receiving an attribute data set associated with a visible characteristic of an entity to be used in a computer graphics system. In another embodiment, the unfiltered data set is noise data lacking a discernable pattern, such as stochastically generated, randomly generated, or pseudo-randomly generated noise.

In a further embodiment, a sum of the frequency spectrum of the first bandlimited data set and a copy of the frequency spectrum of the first bandlimited data is substantially flat if the copy of the frequency spectrum is translated in frequency by the difference between the first and second maximum frequencies.

BRIEF DESCRIPTION OF THE DRAWINGS

The invention will be described with reference to the drawings, in which.

DETAILED DESCRIPTION OF THE INVENTION

Figure 1:
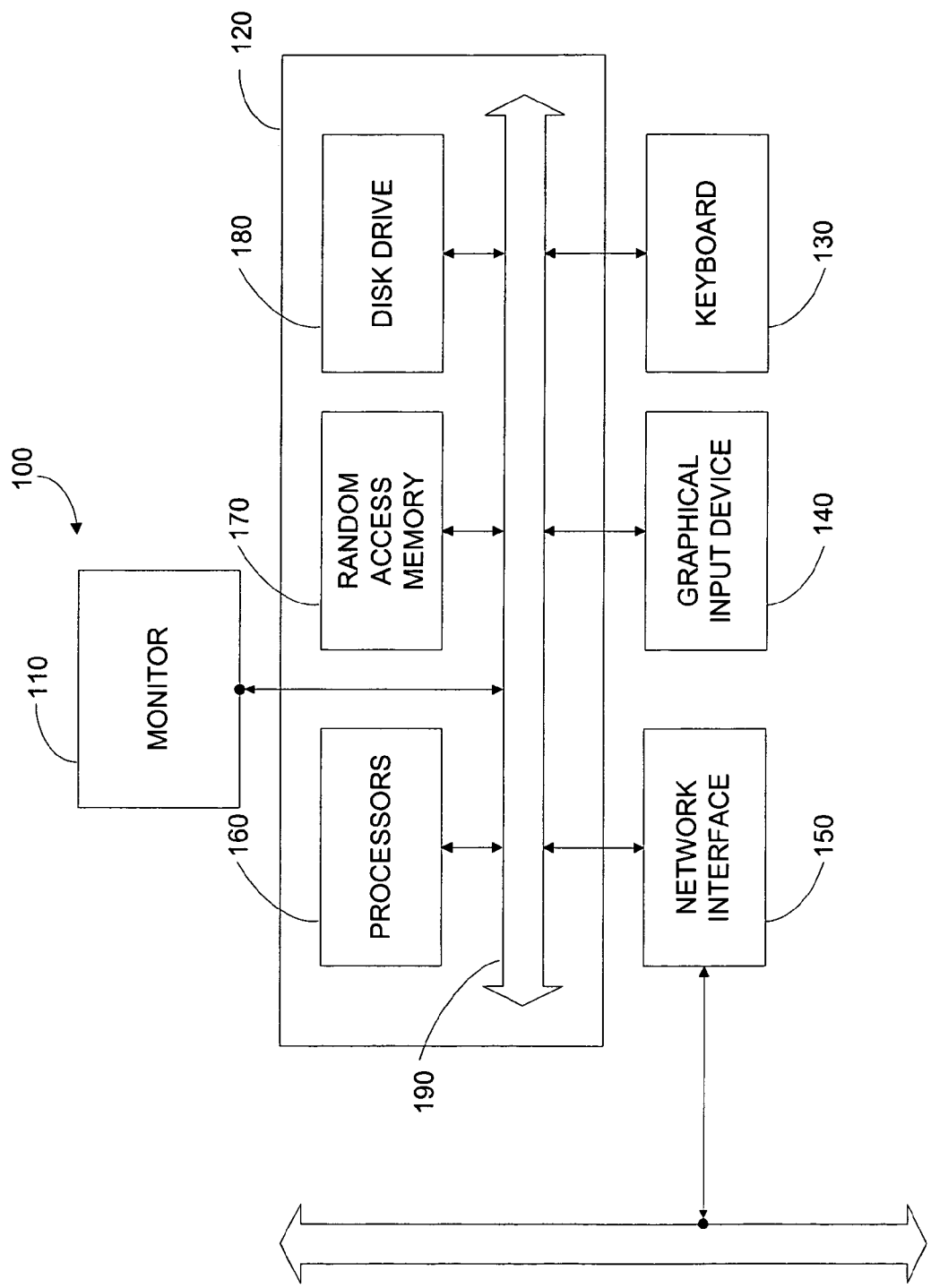
FIG. 1 illustrates a block diagram of a computer system suitable for implementing an embodiment of the invention.

FIG. 1 illustrates a block diagram of a computer system suitable for implementing an embodiment of the invention. FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
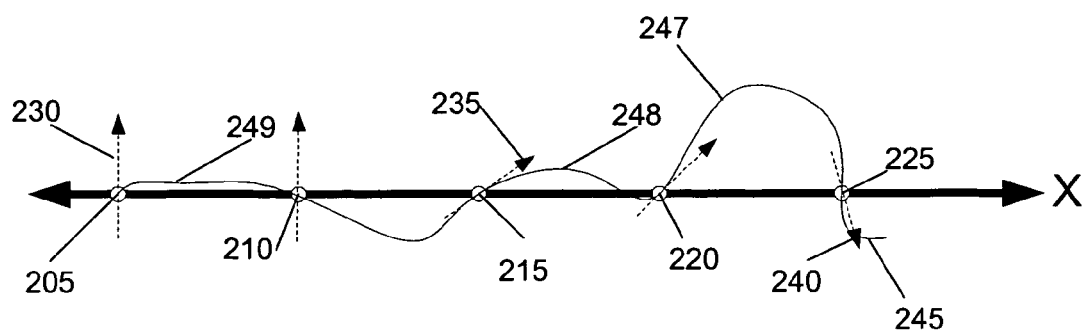
FIGS. 2A-B illustrate a prior type of noise.

Perlin noise is often used as an input to procedural data sets. FIG. 2A illustrates an octave of Perlin noise 200 created according to a prior method. Typically, a base resolution or spatial frequency is chosen for the octave of Perlin noise. It should be noted that the term frequency is used loosely throughout this application to mean either the result of a Fourier transform (or other frequency domain transform) or the resolution of a set of data. A regular grid of sample points such as points 205, 210, 215, 220, and 225 are created. The distance between adjacent sample points is based upon the value of the base spatial frequency. The value of the noise is set to zero at each sample point. Additionally, a randomly selected gradient value is assigned to each sample point, such as gradients 230, 235, and 240 assigned to sample points 205, 215, and 225. Using the value of the noise function and the value of the gradient at each sample point, noise values 245 are interpolated for the noise octave 200. In some implementations, the noise values 245 are defined by a polynomial spline fitted to the sample point values and gradients. Although a one-dimensional noise octave is shown in FIG. 2A, this approach can be extended to generate noise octaves having two, three, or more dimensions.

Figure 2B:
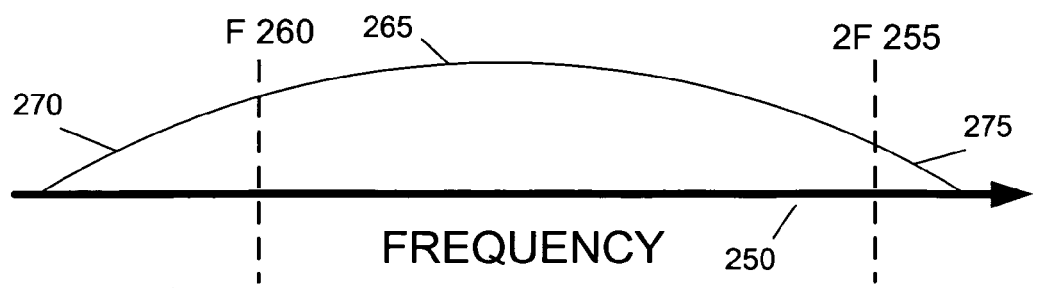

A complete Perlin noise set is generated by combining two or more noise octaves having different base frequencies. To avoid aliasing and blurring, each noise octave should ideally be bandlimited to the frequency range between its base frequency value and twice its base frequency value. However, with Perlin noise, this condition is not satisfied. FIG. 2B illustrates the frequency spectrum 265 of the example noise octave 200 discussed above. The frequency scale 250 is marked with the value of the base frequency 260 and twice the base frequency 255. However, as can be seen in FIG. 2B, a substantial portion 270 of the frequency spectrum 265 is below the base frequency 260 and a smaller portion 275 of frequency spectrum 265 is above twice the base frequency 255. Relatively small changes in the slope of the noise octave, such as in portions 248 and 249 in FIG. 2A, introduce substantial low frequency components that contribute to portion 270 of the frequency spectrum 265, while relatively "steep" changes in the slope of the noise octave, such as portion 247 in FIG. 2A, may introduce high frequency components that contribute to portion 275. The presence of high and low frequency components outside of the desired frequency band creates unwanted aliasing and blurring, respectively. In particular, the weak bandlimiting of low frequency components in Perlin noise introduces substantial difficulties with its use. Additionally, because the Perlin noise function typically passes through zero at every sample point, regular patterns are introduced into the noise function.

An embodiment of the invention uses function spaces generated by scaling functions to generate bandlimited noise octaves. Scaling functions are basis functions that admit multiresolution analysis. A variety of different types of multiresolution analysis scaling basis functions known to those of skill in the art can be used with the present invention, including piecewise constant scaling functions, such as Haar basis functions; piecewise polynomial scaling functions, such as uniform B-spline basis functions of any degree; bandlimited scaling functions, such as sinc functions; and Daubeschies scaling functions. Scaling basis functions such as Haar basis functions, uniform B-spline basis functions, and Daubeschies scaling functions are locally supported, i.e., these scaling basis functions have finite ranges. Other scaling basis functions, such as the sinc function, have an infinite support, i.e. have an infinite range. As discussed in detail below, locally supported scaling basis functions allows noise data to be reconstructed using a small number of noise coefficients in the vicinity of the point of evaluation.

In general, multiresolution analysis techniques such as wavelet transformations and Laplacian pyramids can be used to determine one or more lower resolution versions of a set of data. With wavelet transformations, a higher resolution version of a data set can be constructed from a lower resolution version of the data set and a set of detail coefficients. The set of detail coefficients are multiplied by a set of wavelet or detail basis functions to augment the vector space of the lower resolution version of the data set with the additional resolution of the higher resolution version of the data set. Additional detail coefficients can be used to further reconstruct the set of data at additional higher levels of resolution.

In general, a wavelet transformation of a set of data can be determined by projecting the set of data onto a set of scaling basis functions and a set of wavelet basis functions. In an embodiment, this projection is performed by taking the dot or scalar product of the set of data and the dual of each of the scaling and wavelet basis functions. The resulting projection gives the value of one or more scaling coefficients (C) and one or more detail coefficients (D). For orthogonal wavelet basis functions, such as Haar basis functions (discussed below) or Daubeschies basis functions, the dual of a basis function is the same as the basis function itself. However, for non-orthogonal basis functions, such as B-spline basis functions, the scaling functions and their duals are distinct.

Figure 3A:
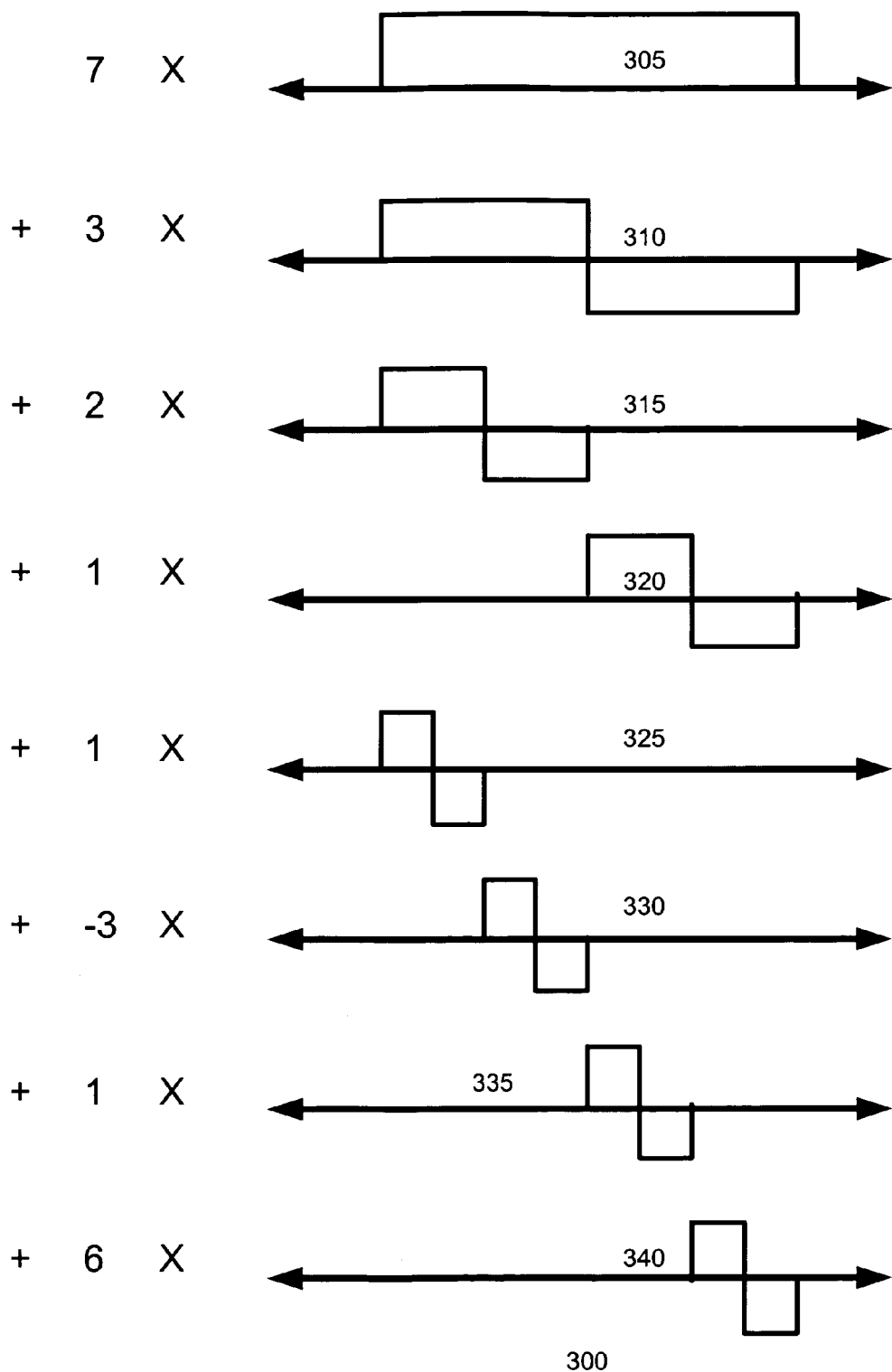
FIGS. 3A-3C illustrate a wavelet decomposition of an example signal and example wavelet basis functions suitable for use with an embodiment of the invention.

There are a variety of different types of scaling and detail basis functions that can be used for wavelet transformations. One of the simplest types is the Haar basis. The Haar basis is a set of step functions and square waves. The Haar basis has the property that the set of scaling and wavelet basis functions for a given level are orthogonal to each other and to the scaling and wavelet basis functions for all higher levels. FIG. 3A, discussed in detail below, illustrates the Haar scaling basis function for the N=0 level and the set of wavelet basis functions for the N=1, 2, and 3 levels of an example eight element data set. By determining the scaling and detail coefficients associated with these basis functions for a set of data, the set of data can be reconstructed at any resolution up to the maximum resolution of the set of data.

TABLE 1

Example Wavelet Transformation

| Level (N) | C | D | Maximum Resolution |
|---|---|---|---|
| 3 | 1 3 3 9 8 10 5 17 | — | R |
| 2 | 2 6 9 11 | 1 −3 1 6 | R/2 |
| 1 | 4 10 | 2 1 | R/4 |
| 0 | 7 | 3 | R/8 |

An additional technique for determining a wavelet transformation of a data set using the Haar basis is to recursively average and difference adjacent values of a data set. Table 1 illustrates a wavelet transformation of an example data set having the values [1,3,3,9,8,10,5, 17]. This set of eight values ($2^3$) corresponds to a level, N, of 3. The data set at level N=3 can be referred to as $C_3$ To determine the wavelet transformation of this set of data for level N=2, each of the adjacent data values are averaged. This forms a set of scaling coefficients at the level N=2, referred to as $C_2$. For example, the average of the first two terms of $C_3$, 1 and 3, is 2, which is the first term of $C_2$. Similarly, the average of the 3 and 9 forms the second term, 6, of $C_2$.

Similarly, the difference between a pair of adjacent data values and the average its corresponding scaling function coefficient at the next lowest level is determined to define a set of detail coefficients. For example, the first term of the set of detail coefficients at the N=2 level, referred to as $D_2$, is 1, which is the difference between the second term of $C_3$, 3, and the corresponding first term of $C_2$, 2. This term of $D_2$ is also the difference between the sum of the corresponding first term of $C_2$, 2, and the first term of $C_3$, 1. Similarly, the difference between the third and fourth terms of the $C_3$ set and the corresponding second term of the $C_2$ set is −3. In general, for a pair of scaling coefficients at level N, a corresponding detail coefficient at level N−1 is the difference between a corresponding scaling coefficient at level N−1 and a left-side scaling coefficient of the pair at level N. Similarly, for a pair of scaling coefficients at level N, a corresponding detail coefficient at level N−1 is the difference between the right-side scaling coefficient of the pair at level N and a corresponding scaling coefficient at level N−1.

This process of averaging and differencing can be repeated to determine scaling coefficients for successively lower resolution levels. The data set can be reconstructed at any resolution level up to its original resolution using the set of scaling coefficients and the set of detail coefficients. At each level, the set of scaling coefficients represents a lower resolution version of the original data set. FIG. 3A illustrates a wavelet decomposition 300 of an example signal suitable for use with an embodiment of the invention. The wavelet decomposition 300 includes a scaling basis function 305 for resolution N=0, and wavelet basis functions $D_0$, 310; $D_1$, 315 and 320; and $D_2$, 325, 330, 335, and 340. Scaling basis functions for $C_1$, $C_2$, and $C_3$ have been omitted for clarity, but are similar to basis function 305. Multiplying each basis function by its associated coefficient and summing the results can be used to reconstruct a version of the data set at any resolution level. For example, the scaling coefficient of $C_0$ and detail coefficient sets $D_0$ can be used to reconstruct $C_1$, which is a version of the data set at resolution level N=1. Detail coefficient set $D_1$, in conjunction with $C_0$ and $D_0$ or with $C_1$, can be used to reconstruct $C_2$, which is a version of the data set at resolution level N=2. Similarly, detail coefficient set $D_2$, in conjunction with either $C_0$, $D_0$, and $D_1$; $C_1$ and $D_1$; or $C_2$, can be used to reconstruct $C_3$, which is the original data set.

For any type of scaling basis functions, the projection of the original data set onto the scaling basis functions of a level result in the best possible representation of the data set at this resolution level. For example, the projection of a data set onto a set of spline scaling basis functions of a given resolution level results in a set of scaling coefficients representing a least squares best fit representation of the data set at this resolution level.

At each level, the set of scaling coefficients represents a lower resolution version of the original data set. Each resolution level of the data set is bandlimited. For example, if the resolution of the data set $C_3$ at resolution level N=3 is R, the resolution of this data set at resolution level N=2 is R/2. Similarly, the resolution of the data set at resolution level N=1 is R/4. The set of detail coefficients at each level represent additional information that cannot be represented by the scaling coefficients at that level. In the case of orthogonal basis functions such as the Haar basis and other types of basis functions such as a B-spline basis function, the detail coefficients of a given resolution level represent all of the information in the next higher resolution level that cannot be represented at the given resolution level.

If a basis function, such as a Haar or spline basis function, centered at x=0 is represented as $\phi(x)$, then other vectors F(x) can be represented as the linear combination of scaled versions of the basis function translated by integer amounts i. This can be expressed as $$F(x) = \sum_i f_i \phi(x - i).$$

The set of all vectors that can be expressed by varying the values of the coefficients $f_i$ forms a vector space at a first resolution level, referred to as vector space $S_0$. As described above with the Haar basis, a set of basis functions at a second resolution level can be used to represent additional detail of the function in a higher resolution vector space, referred to as vector space $S_1$.

For some types of basis functions, the set of basis functions in $S_1$ can be derived from the basis functions $S_0$ by reducing the width of the basis function in $S_0$ in half and translating by half integer values. Thus, if the basis function in $S_0$ is $\phi(x)$, the basis function in $S_1$ is $\phi(2x-i)$. This relationship can be extended to any arbitrary resolution level N, where the basis functions in vector space $S_N$ are scaled in width by half and translated by half integer values from the basis functions of vector space $S_{N-1}$.

All vectors in $S_0$ are also in $S_1$ if there are coefficient values $p_k$ such that:

$$\phi(x) = \sum_k p_k \phi(2x - k).$$

If these coefficient values exist, then all vectors in $S_0$ are also in $S_1$ and the basis function $\phi(x)$ is said to be refineable. However, not all vectors in vector space $S_1$ are in vector space $S_0$. Examples of refineable basis functions include piecewise constant scaling functions, such as Haar basis functions; piecewise polynomial scaling functions, such as uniform B-spline basis functions of any degree; bandlimited scaling functions, such as sinc functions; and Daubeschies scaling functions.

Figure 3B:
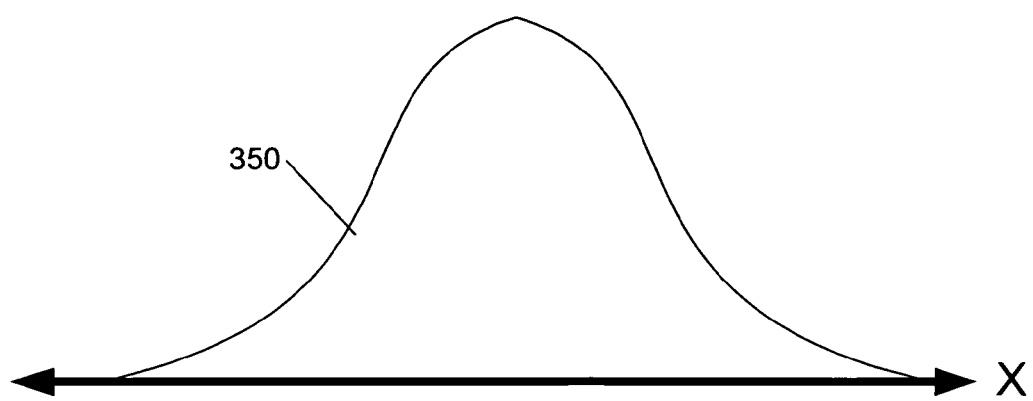
Figure 3C:
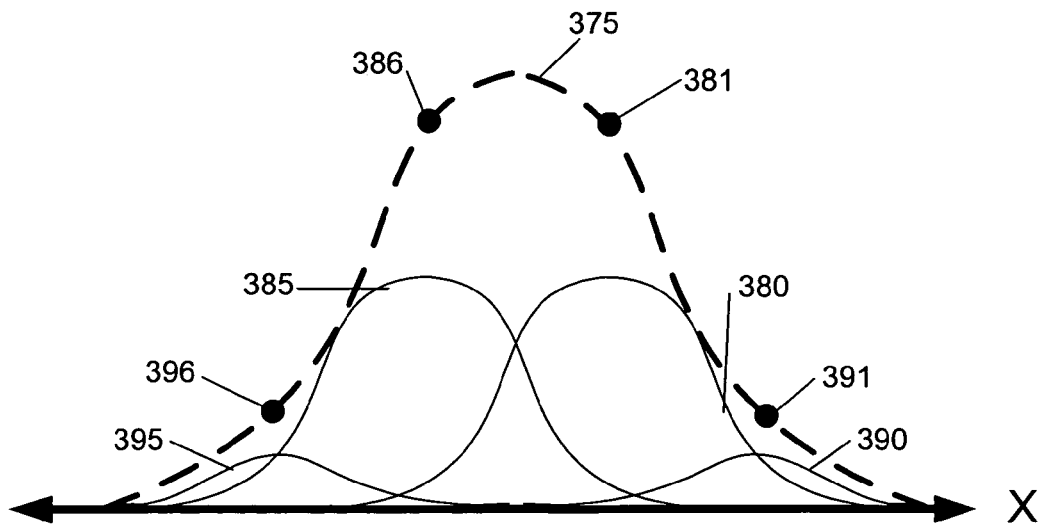

FIG. 3B illustrates an example uniform quadratic B-spline basis function 350. FIG. 3C illustrates the refineability of example spline basis function 350. Outline 375 corresponds with example spline basis function 350 in vector space $S_N$, corresponding with a resolution level of N. Example spline basis function 350 can be represented as the linear combination of basis functions in vector space $S_{N+1}$ that have been reduced in width by half, offset along half-integers, and scaled in height by appropriate values of $p_K$.

In this example, the spline basis function 350 can be represented as the linear combination of basis functions 380, 385, 390, and 395. Each of these basis functions 380, 385, 390, and 395 has a width that is half of that of basis function 350. Additionally, each of the basis functions 380, 385, 390, and 395 is offset along a half integer from basis function 350. For example, basis function 380 is centered a half integer to the right of the center of basis function 350. Basis function 390 is centered at 3/2 integers to the right of the center of basis function 350. Similarly, basis function 385 is centered a half integer to the left of the center of basis function 350 and basis function 395 is centered at 3/2 integers to the left of the center of basis function 350.

The basis functions 380, 385, 390, and 395 are scaled in height relative to the height of basis function 350 according to their respective values of $p_k$. For quadratic B-splines, the values of $p_k$ are ¼, ¾, ¾, and ¼ for basis functions 395, 385, 380, and 390, respectively. The values of $p_k$ for basis functions in $S_{N+1}$ centered at all other locations are zero, and thus these basis functions have been omitted from FIG. 3C. Points 396, 386, 381, and 391 illustrate the values of $p_k$ for basis functions 395, 385, 380, and 390, respectively.

Figure 4A:
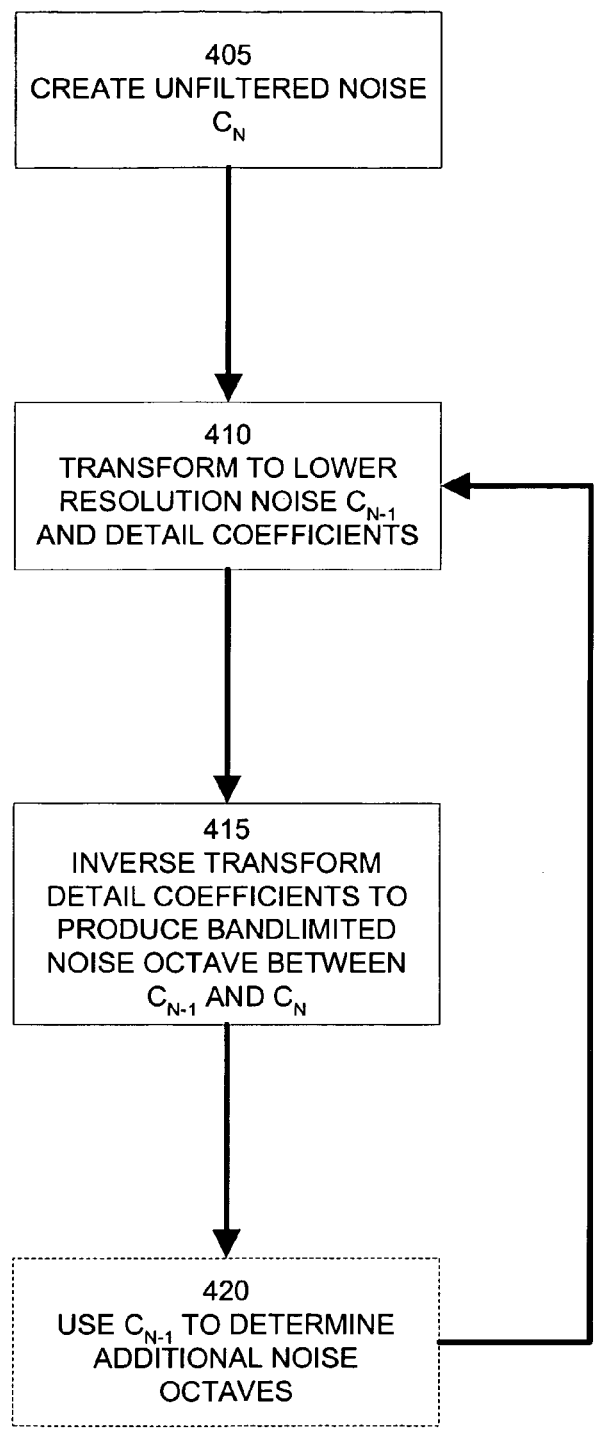
FIGS. 4A-4B illustrate methods of creating a bandlimited noise octave according to an embodiments of the invention.
Figure 4B:
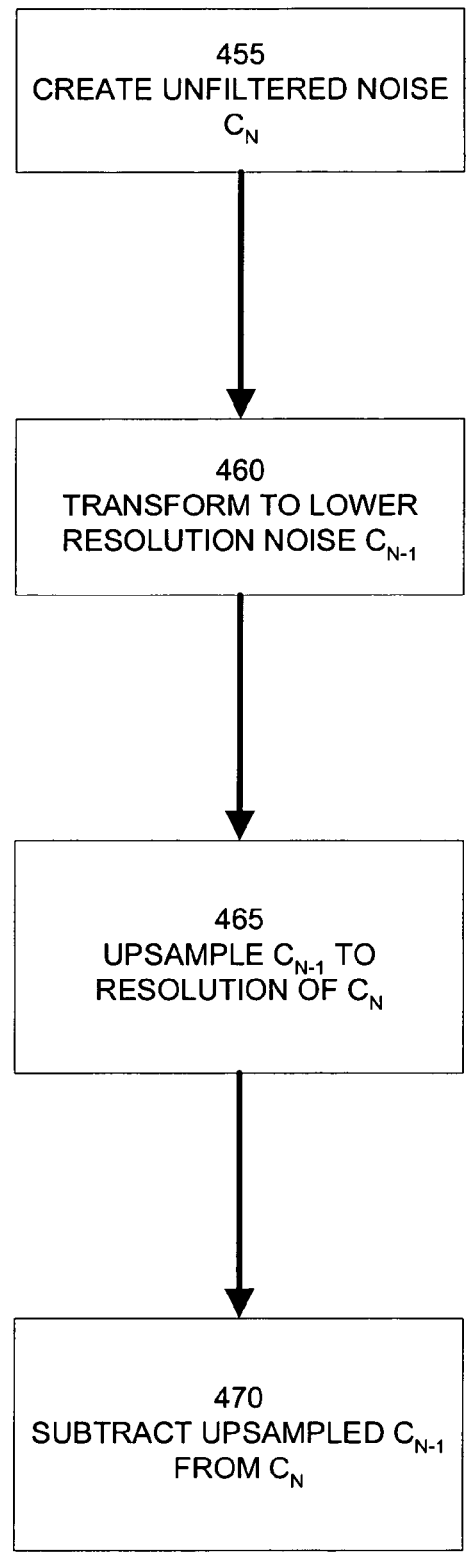
Figure 5:
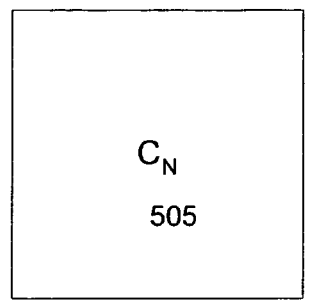
FIG. 5 illustrates an example application of a method of creating a bandlimited noise octave according to an embodiment of the invention.
Figure 5:
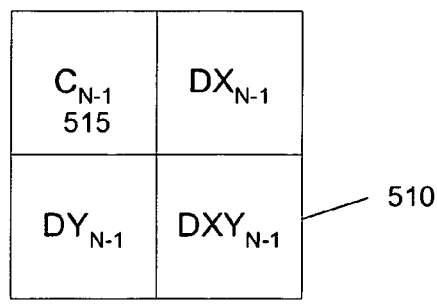
Figure 5:
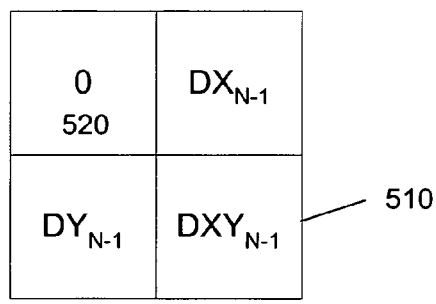
Figure 5:
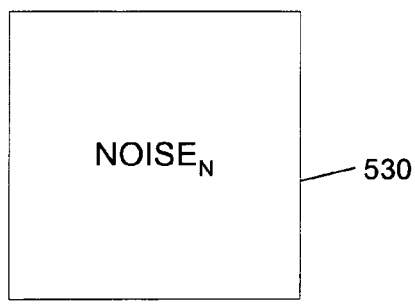

An embodiment of the invention uses these properties of the wavelet basis functions and their associated detail coefficients to create bandlimited noise octaves. FIG. 4 illustrates a method 400 of creating a bandlimited noise octave according to an embodiment of the invention. At step 405, an unfiltered noise set, $C_N$, is created. The unfiltered noise set can be created using any technique for generating random or pseudorandom data. The unfiltered noise set can be arranged as a one, two, three, or more dimensional set and can include any number of elements. In a further embodiment, the unfiltered noise set is an infinite set, portions of which are evaluated as needed by method 400. In an embodiment, the maximum spatial frequency of the unfiltered noise set is specified by the Nyquist limit of the unfiltered noise set. In another embodiment, the maximum spatial frequency of the unfiltered noise set can be less than its Nyquist limit. In an embodiment, the unfiltered noise set will have a substantially flat frequency spectrum, equivalent to that of white noise. FIG. 5 illustrates an example application 500 of a method of creating a bandlimited noise octave according to an embodiment of the invention. FIG. 5 shows an example unfiltered noise set 505 resulting from step 405.

Step 410 applies a filtering operation on the unfiltered noise set $C_N$ to produce a lower resolution level of the unfiltered noise set $C_{N-1}$ and a set of detail coefficients $D_{N-1}$ representing the portion of the unfiltered noise set that cannot be represented by $C_{N-1}$. In an embodiment, step 410 projects the unfiltered noise set $C_N$ onto a set of scaling basis functions and wavelet basis functions for the N-1 level of resolution. Step 410 can use any type of basis functions, including a Haar basis or a spline basis. In a further embodiment, step 410 can skip the determination of $C_{N-1}$ and only determine the set of detail coefficients $D_{N-1}$.

Returning to the example of FIG. 5, step 410 creates a set of detail coefficients $D_{N-1}$ 510 and/or a lower resolution level of the unfiltered noise set $C_{N-1}$ 515. In this example, the unfiltered noise set $C_N$ is a two-dimensional set. As a result, the set of detail coefficients 510 can be subdivided into a set of horizontal detail coefficients, $DX_{N-1}$, a set of vertical detail coefficients, $DY_{N-1}$, and a set of diagonal detail coefficients $DXY_{N-1}$.

Step 415 performs an inverse transformation on the set of detail coefficients $D_{N-1}$ alone, without the contribution of $C_{N-1}$, to determine the noise octave $Noise_N$. In an embodiment, this is performed by assuming the value of $C_{N-1}$ is 0 for all of its terms. For example in FIG. 5, the value of $C_{N-1}$ 520 is assumed to be 0. In an example inverse transformation, using a Haar basis, the left and right terms of each pair of terms in the noise octave $Noise_N$ is equal to the corresponding term of the set of detail coefficients $D_{N-1}$ multiplied by −1 and 1, respectively. Continuing with this example, if the first term of the set of detail coefficients $D_{N-1}$ is 1, then the first two terms of the noise octave $Noise_N$ are −1 and 1, respectively. Similarly, if the second term of the set of detail coefficients $D_{N-1}$ is −3, then the third and fourth terms of the noise octave $Noise_N$ are 3 and −3, respectively. Table 2 illustrates the values of an example noise octave $Noise_3$ created from the unfiltered noise set $C_N$ shown in Table 1. $Noise_N$ 530 in FIG. 5 is an example noise octave determined from the inverse transformation of detail coefficient set 510 with the value of all elements of $C_{N-1}$ assumed to be 0.

TABLE 2

Example Wavelet Noise Octave

| Level (N) | C | D | Noise | Noise Octave Frequency Band |
|---|---|---|---|---|
| 3 | 1 3 3 9 8 10 5 17 | — | −1 1 −3 3 −1 1 −6 6 | F to F/2 |
| 2 | 2 6 9 11 | 1 −3 1 6 | | |

As discussed above, because the set of detail coefficients $D_{N-1}$ represent the portion of data set, in this case the unfiltered noise set $C_N$, having frequency components between the maximum frequencies of two adjacent levels of resolution, the inverse transformation of this set of detail coefficients $D_{N-1}$ is a set of noise bandlimited between these two frequencies.

There are numerous equivalent methods of determining a bandlimited noise octave. In an embodiment, the determination of the set of detail coefficients $D_{N-1}$ can be bypassed. FIG. 4B illustrates another method 450 of determining a bandlimited noise octave.

Step 455 of method 450 creates an unfiltered noise set, $C_N$, similar to that discussed above. Step 460 transforms the unfiltered noise set $C_N$ into a lower resolution noise set $C_{N-1}$. In an embodiment, step 460 downsamples unfiltered noise set $C_N$ by a factor of two to create $C_{N-1}$. In an embodiment, step 460 averages two noise samples for each dimension of noise set $C_N$ to determine each noise sample in $C_{N-1}$. In a more general embodiment, if the noise set $C_N$ is expressed as the linear combination of basis functions at resolution level N, step 460 projects the samples of noise set $C_N$ onto the basis functions of resolution level N-1 to produce noise set $C_{N-1}$. As noise set $C_{N-1}$ has a lower resolution than noise set $C_N$, some information from noise set $C_N$ is lost in the transformation to noise set $C_{N-1}$. In a further embodiment, the unfiltered noise set $C_N$ can be filtered using a spatially invariant or spatially variant filter to create $C_{N-1}$. In an embodiment, the maximum spatial frequency of the noise set $C_{N-1}$ is specified by the Nyquist limit of noise set $C_{N-1}$. In another embodiment, the maximum spatial frequency of noise set $C_{N-1}$ can be less than its Nyquist limit.

Step 465 upsamples or inverse transforms noise set $C_{N-1}$ to resolution level N. In an embodiment, step 465 scales noise set $C_{N-1}$ by a factor of two in each dimension to create an upsampled version of noise set $C'_{N-1}$. This is mathematically equivalent to assuming the detail coefficients $D_{N-1}$ are equal to zero. In another embodiment, step 465 applies the inverse of the transformation or projection of step 460 to the noise set $C_{N-1}$ to create an upsampled version of the noise set, $C'_{N-1}$.

Step 470 subtracts the unsampled noise set $C'_{N-1}$ from the original unfiltered noise set $C_N$ that was created in step 455. The difference between these two noise sets is a bandlimited set of noise, which has a frequency range between the maximum frequency of level N−1 and level N. As discussed above, some information from $C_N$ is lost in the transformation from $C_N$ to $C_{N-1}$. This lost information corresponds to information in the frequency range greater than the maximum frequency of resolution level N−1. By subtracting the upsampled noise set $C'_{N-1}$ from noise set $C_N$, this lost information in the frequency range between the maximum frequency of resolution level N−1 and resolution level N is isolated.

Table 3 illustrates the values of an example noise octave Noise$_3$ created from the unfiltered noise set $C_N$ shown in Table 1 using method 450. In this example, the unfiltered noise of resolution level 3 is downsampled to resolution level 2, then upsampled to back to resolution level 3. The upsampled version of the noise, $C'_3$, is subtracted from the unfiltered noise $C_N$ to define a bandlimited noise octave.

TABLE 3

| | Example Wavelet Noise Octave | | |
|---|---|---|---|
| Level (N) | C | C' | Noise = C − C' |
| 3 | 1 3 3 9 8 10 5 17 | | |
| 2 | | 2 6 9 11 | |
| 3 | | | 2 2 6 6 9 9 11 11   −1 1 −3 3 −1 1 −6 6 |

Methods 400 and 450 of creating a bandlimited noise octave are mathematically equivalent. In method 400, $C_{N-1}$ is set to zero and $D_{N-1}$ is inverse transformed to determine $D_N$. In method 450, $D_{N-1}$ is set to zero and $C_{N-1}$ is inverse transformed and subtracted from $C_N$. The methods 400 and 450 determine a set of noise coefficients $n_i$ describing a bandlimited noise octave. The value of the bandlimited noise octave at any location x (e.g. Noise(x)) is defined as the linear combination of the noise octave's scaling basis functions weighted by the nearby noise coefficients $n_i$. This may be expressed as $$N(x) = \sum_i n_i \phi(2x - i).$$

Because of the properties of the basis functions used to construct bandlimited noise octaves, it can be shown that any bandlimited noise octave at resolution level N is orthogonal to the basis functions at all resolution levels less than N, such as resolution levels N−1, N−2, and so forth. This is true regardless of whether the scaling basis functions at different resolution levels are orthogonal to each other, such as Haar scaling basis functions, or not orthogonal to each other, such as B-spline scaling basis functions.

Mathematically, the orthogonality property of bandlimited noise octaves can be expressed for a one-dimensional set of noise as $\int \text{Noise}_N(2^j x - l)\phi(x - i)dx = 0$ for all integers l and i when integer j is greater than or equal to zero. Integer j represents the resolution level under evaluation. In this expression, j=−1 indicates the current resolution level and increased values of j indicate lower resolution levels. Thus, if bandlimited noise octaves are constructed using wavelet basis functions for resolution level N, they can be scaled to any other resolution level N' and be guaranteed to have no effect on images at any resolution level less than N'.

Expressed another way, if refineable scaling basis functions are used to create an unfiltered noise set in vector space $S_N$ and a filtered version of the noise set in lower resolution vector space $S_{N-1}$, then vector space $S_{N-1}$ is contained within vector space $S_N$, due to the refineability property of the scaling basis functions. Morever, the bandlimited noise set is found in a complement of vector spaces $S_{N-1}$ and $S_N$, such that at least a portion of the bandlimited noise set cannot be represented in vector space $S_{N-1}$. In a further embodiment, the bandlimited noise set is found in an orthogonal complement of vector spaces $S_{N-1}$ and $S_N$, such that no portion of the bandlimited noise set can be represented in vector space $S_{N-1}$.

Figure 6A:
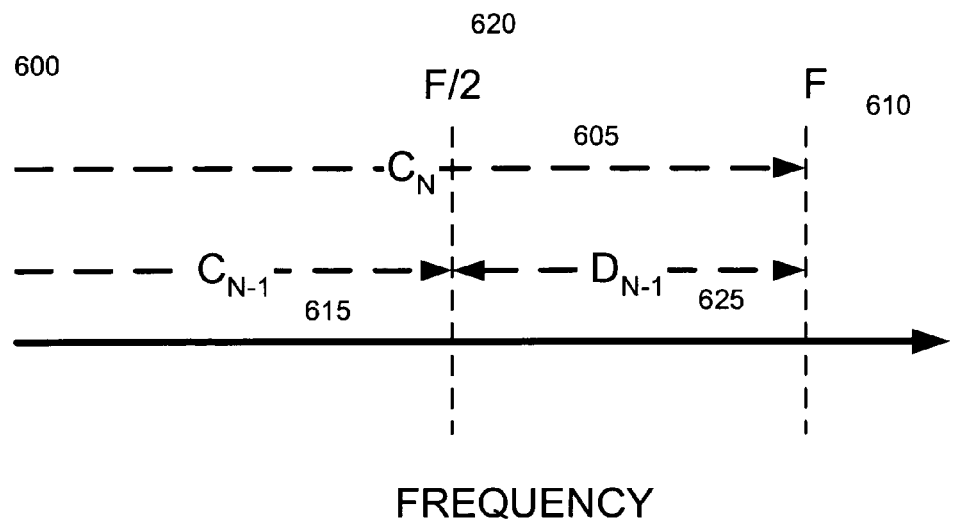
FIG. 6A illustrates the frequency spectrum of an example bandlimited noise octave according to an embodiment of the invention.

FIG. 6A illustrates the frequency spectrum 600 of an example bandlimited noise octave according to an embodiment of the invention. Frequency spectrum 600 includes the spectrum 605 of the unfiltered noise set $C_N$. Spectrum 605 has a maximum frequency of F, 610. After filtering the noise set as described in step 410, the $C_{N-1}$ set has a spectrum 615. Spectrum 615 has a maximum frequency F/2, 620. The set of detail coefficients $D_{N-1}$ represent the information in Cn that is in spectrum 625. Spectrum 625 is bounded by frequencies F/2, 620, and F, 610. As a result, the inverse transformation of the set of detail coefficients $D_{N-1}$ will also be substantially bandlimited between these frequencies, with minimal spectral components outside of this frequency band due to numerical limits of calculation and other minor errors and approximations.

In an embodiment, the frequency spectrum of the bandlimited noise is approximately zero outside of the range between frequencies F/2, 620 and F, 610. In another embodiment, the frequency spectrum of the bandlimited noise is approximately flat between frequencies F/2, 620 and F, 610 and diminishes abruptly outside of this range. In a further embodiment, the bandlimited noise diminishes from a significant magnitude to approximately zero within a power of two range from frequencies F/2, 620 and F, 610. In still another embodiment, the frequency spectrum of the bandlimited noise is such that the sum of the frequency spectrum of the first bandlimited data set and a copy of the frequency spectrum of the first bandlimited data is substantially flat, if the copy of the frequency spectrum is translated in frequency up or down by the difference between frequencies F, 610 and F/2, 620.

A complete noise function can be created by combining two or more bandlimited noise octaves created as described in method 400. Noise octaves can be generated at different frequency bands or at the same or overlapping frequency bands. Noise octaves can be created from the same unfiltered noise function or different unfiltered noise functions. The noise set can be used to define attribute data of objects, either directly or as an input to an algorithm or procedure.

Figure 6B:
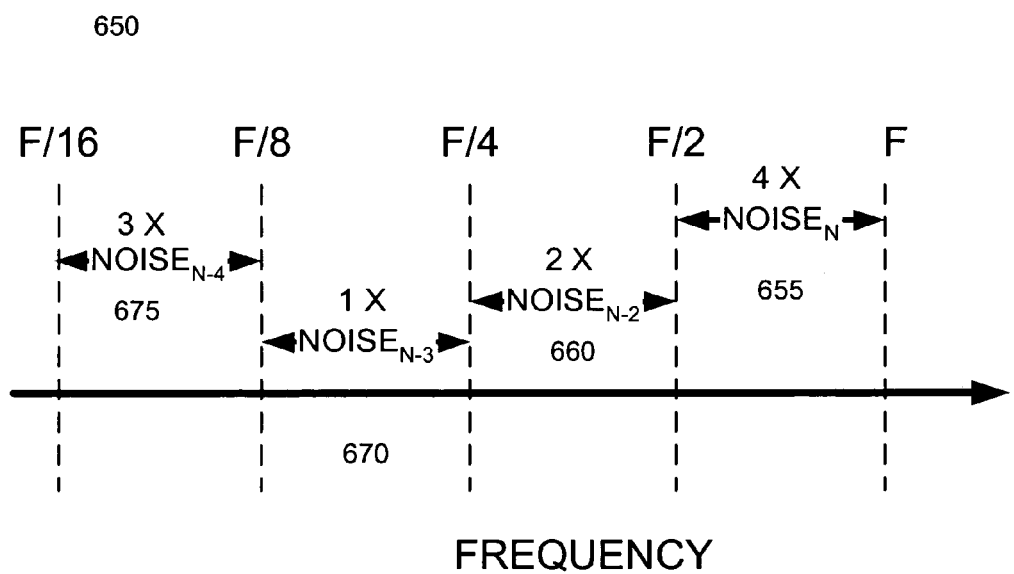
FIG. 6B illustrates the creation of an example noise function from two or more noise octaves according to an embodiment of the invention.

FIG. 6B illustrates the creation of an example noise function 650 from two or more noise octaves according to an embodiment of the invention. Noise function 650 is created from the weighted sum of noise octaves 655, 660, 670, and 675. The weights associated with each noise octave, such as 4 with noise octave 655, can be chosen to emphasize or deemphasize portions of the spectrum of noise function for aesthetic purposes. Additionally, noise octaves can be removed from the noise set to bandlimit the noise or any attribute data created from the noise, so that aliasing and blurring do not occur. An additional embodiment attenuates the highest and/or lowest frequency noise octaves in a noise function based upon a center frequency of the noise function, for example using a cubic function. This smoothly fades noise bands into and out of the noise function, preventing abrupt transitions and popping artifacts when the noise function is applied to surfaces where the center frequency gradually changes, such as a ground plane extending to the horizon.

Large objects and complex scenes, for example those shown in landscapes, often use a large or even infinite set of noise data to determine its attribute data. In these cases, portions of the infinite unfiltered noise set can be generated procedurally on demand as the corresponding portions of the object are being rendered, for example using a random or pseudorandom number generator. To create noise octaves on demand for a given point on an object, the values of the unfiltered noise set must be determined for a number of points surrounding the given point of the object. Typically, the number of surrounding points must be sufficiently large so that the excluded portions of the unfiltered noise set only contribute negligibly, if at all, to the value of the noise octave at the given point.

For example, to determine the value of a one-dimensional noise octave for a given point on demand, the unfiltered noise values of approximately 40 surrounding points must be processed. Thus, in an embodiment applying method 400, the determination of the noise value on demand for a single given point requires generating unfiltered noise values for 40 points, filtering the set of 40 unfiltered noise values to determine a set of 20 detail coefficients, and then inverse transforming at least one of the set of detail coefficients to determining the value of the noise octave at the given point. This number of points is selected because it encompasses the unfiltered noise values in approximately 99% of the area of an example quadratic B-spline basis function. For other types of basis functions and/or different accuracy requirements, a different number of unfiltered noise values can be evaluated to determine the value of a point in a noise octave.

In some applications, noise octaves can be precalculated and cached. However, sample points on an object during rendering are sometimes so far apart that they fall outside of the range of cached noise octave values, especially when rendering distant objects. Furthermore, the computational requirements increase exponentially for noise sets having more than one dimension. Continuing with the above example, if a one-dimensional noise octave requires the evaluation of 40 surrounding points of the unfiltered noise data, a two-dimensional noise octave requires the evaluation of 1600 surrounding points and a three-dimensional noise octave requires the evaluation of 64000 surrounding points.

To reduce the computational requirements in computing the value of noise octaves on demand, a further embodiment precalculates the values of multiple sets of noise octaves, referred to as noise tiles. Noise tiles can be reused to determine the values of the noise functions at many different points. For example, a tile of random numbers, such as that defined in step 405 or 455, can be applied to any portion of an infinite set, representing a line, plane, volume, or higher-dimensional set. Bandlimited noise data for this portion of an infinite set can be defined using method 400, 450, or equivalents thereof. In determining a bandlimited noise values from a tile of random numbers, an embodiment of the invention can assume that the tile of random numbers repeats when the downsampling or upsampling filter crosses tile boundaries. The resulting bandlimited noise set or noise tile can be tiled over the infinite set without the appearance of seams. However, a repeating pattern can be discernable from noise tiles, particularly if the noise tile is relatively small compared with the field of view. Embodiments discussed below can reduce or eliminate the appearance of patterns when tiling or otherwise combining sets of bandlimited noise.

Figure 7:
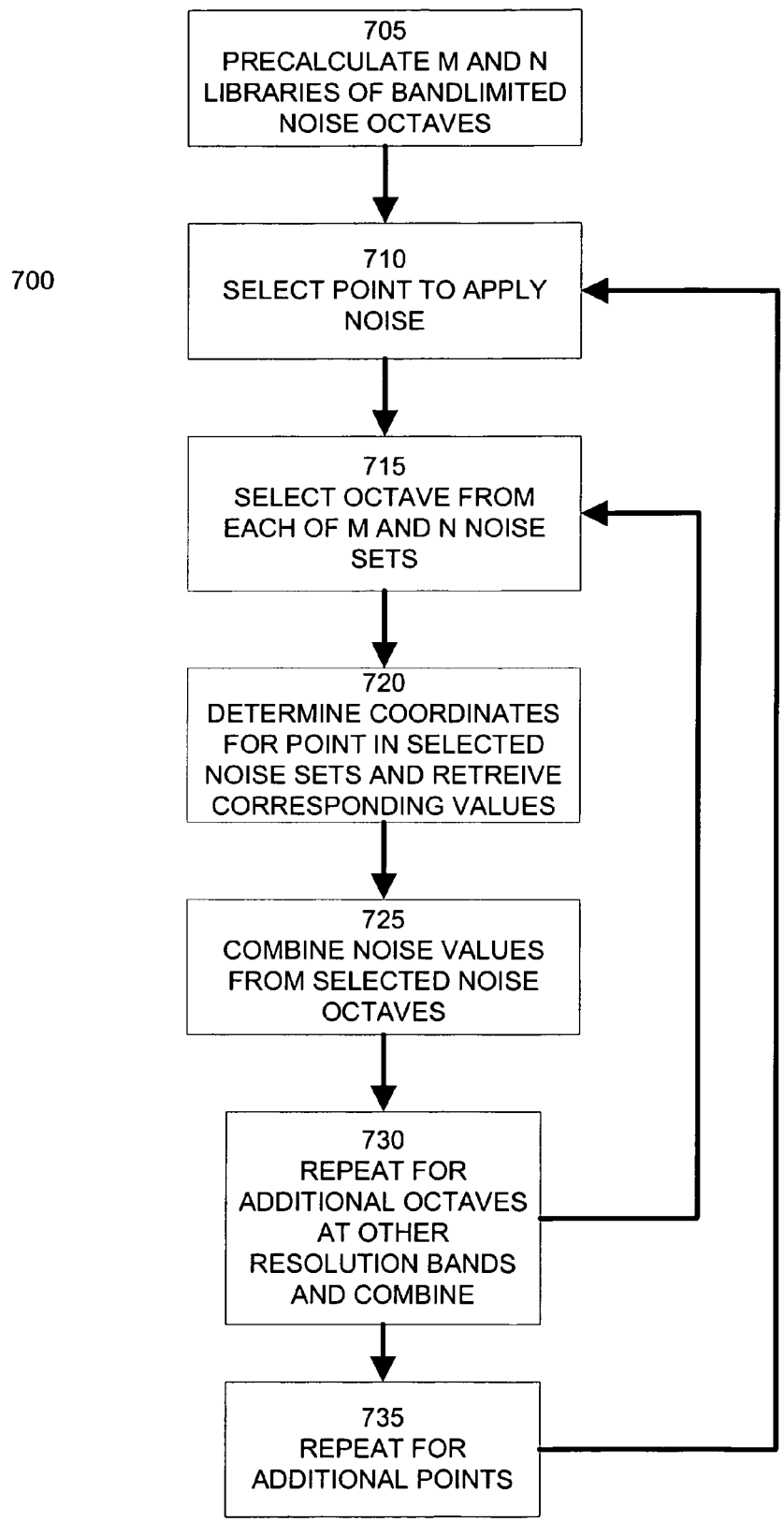
FIG. 7 illustrates an optimized method for creating bandlimited noise octaves according to an embodiment of the invention.

FIG. 7 illustrates an optimized method 700 for creating bandlimited noise octaves according to an embodiment of the invention. Step 705 generates at least two libraries, M and N, of bandlimited noise octaves using the method 400 discussed above. Each library includes one or more bandlimited noise octaves. The noise octaves of each library can each have any number of dimensions and can be based on unfiltered noise sets of any arbitrary size. In an embodiment, the unfiltered noise sets used for the M and N libraries are differently sized to create substantial phase differences when tiling noise octaves from the M and N libraries. This can be selecting sizes for the unfiltered noise sets that maximize their least common multiple. Additionally, unfiltered noise sets having sizes that are even numbers is convenient for determining bandlimited noise octaves. For example, noise octaves in the M library can be derived from an unfiltered noise set of with 42 elements, while the noise octaves in the N library can derived from an unfiltered noise set with 38 elements.

Figure 8:
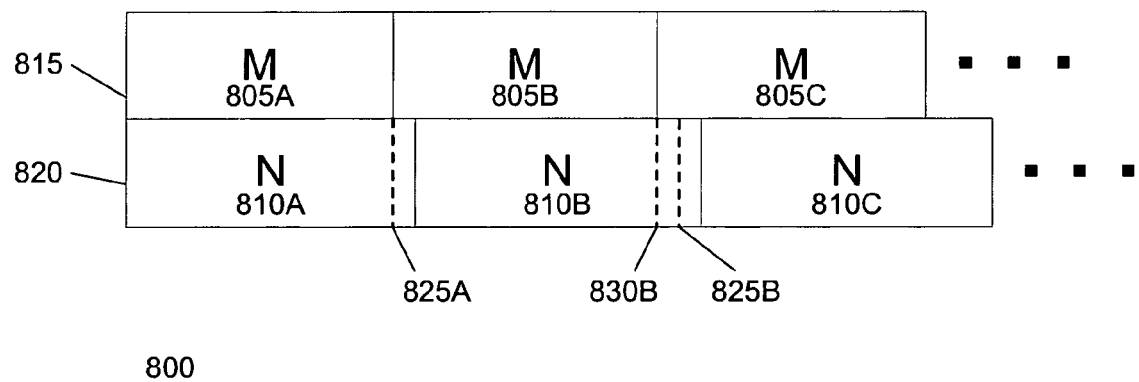
FIG. 8 illustrates an example tiling of a pair of out-of-phase noise octaves suitable for use with an embodiment of the invention.

FIG. 8 illustrates an example tiling 800 of a pair of out-of-phase noise octaves suitable for use with an embodiment of the invention. Tiling 800 includes multiple copies of noise octave M, 805a, 805b, and 805c, arranged end to end. Tiling 800 includes multiple copies of noise octave N, 810a, 810b, and 810c, similarly arranged. In this example, noise octaves 805 and 810 are one dimensional sets of noise. The set 815 of multiple copies of noise octave M forms a line, which can be extended as needed for any arbitrary length. Similarly, the multiple copies of noise octave N form line 820. If the noise octaves are two dimensional sets of noise, then each set of multiple copies of a noise octave forms a plane. In embodiments, tiling 800 can be extended to noise octaves of three or more dimensions.

In the example tiling 800, noise octaves M and N are differently sized to create phase differences when tiling. For example, although the first elements of octaves 805a and 810a will be aligned, the beginning of octave 805b will be aligned with the end of octave 810a, at point 825a. Similarly, the beginning of octave 805c will be aligned with the end of octave 810b, at point 830b. In this example, point 830b is to the left of point 825b, which corresponds to point 825a of octave 810a.

Step 710 selects a point at which the noise value is to be determined. This point can be determined by a renderer or any other hardware and/or software system. Step 710 selects at least one noise octave from each of the libraries. In an embodiment, the selected noise octaves have similar or the same frequency bands. In an embodiment, each library includes two or more noise octaves for each frequency band and step 710 randomly or pseudorandomly selects one or more noise octaves from the library.

Step 720 determines indices or coordinates corresponding to the selected point in each of the selected noise octaves. In an embodiment, it is assumed that each of the selected noise octaves is part of an infinitely tiled set, for example as described in FIG. 8. In this embodiment, the coordinates of the selected point are determined within this infinitely tiled set. For example, the coordinates of the selected point within this infinitely tiled set can be the coordinates of the point in a local coordinate system, such as a texture coordinate system. In an embodiment, the coordinates of the point in each of the selected noise octaves is determined by the modulo division of the point's coordinates in the infinitely tiled set by the size of each dimension of each noise octave.

Step 725 retrieves the values of the selected noise octaves at the locations specified by the sets of coordinates of the selected point in the selected noise octaves. The values of the selected noise octaves are then added or otherwise combined to create a combined noise octave value for the selected point. Because the selected noise octaves have different sizes, thereby tiling out of phase, the appearance of regular patterns due to repeating noise octave values is reduced. In an embodiment, the combined noise octave value can be normalized or scaled to fall within a desired numerical range.

Step 730 repeats steps 715 through 725 to determine one or more additional combined octave values at other frequency bands. In an embodiment, the number of other frequency bands considered is limited by the maximum spatial bandwidth supported by the renderer. Step 730 determines the value of the noise function at the selected point by combining the combined noise octave values from two or more frequency bands. As discussed in embodiments detailed below, the noise function can be specified as a weighted combination of combined noise octave values, similar to that discussed with reference to FIG. 6B. In an embodiment, the coordinates of the selected point are scaled to account for the different resolution of each noise octave.

One problem that can occur when combining random or noise data is changes to the distribution of the values of the combined result. For example, if two functions have random output distributions, the output distribution of the combination of these functions will be the convolution of their respective output distributions. As a result, the distribution of the combined functions will be biased towards some output values.

Figure 9:
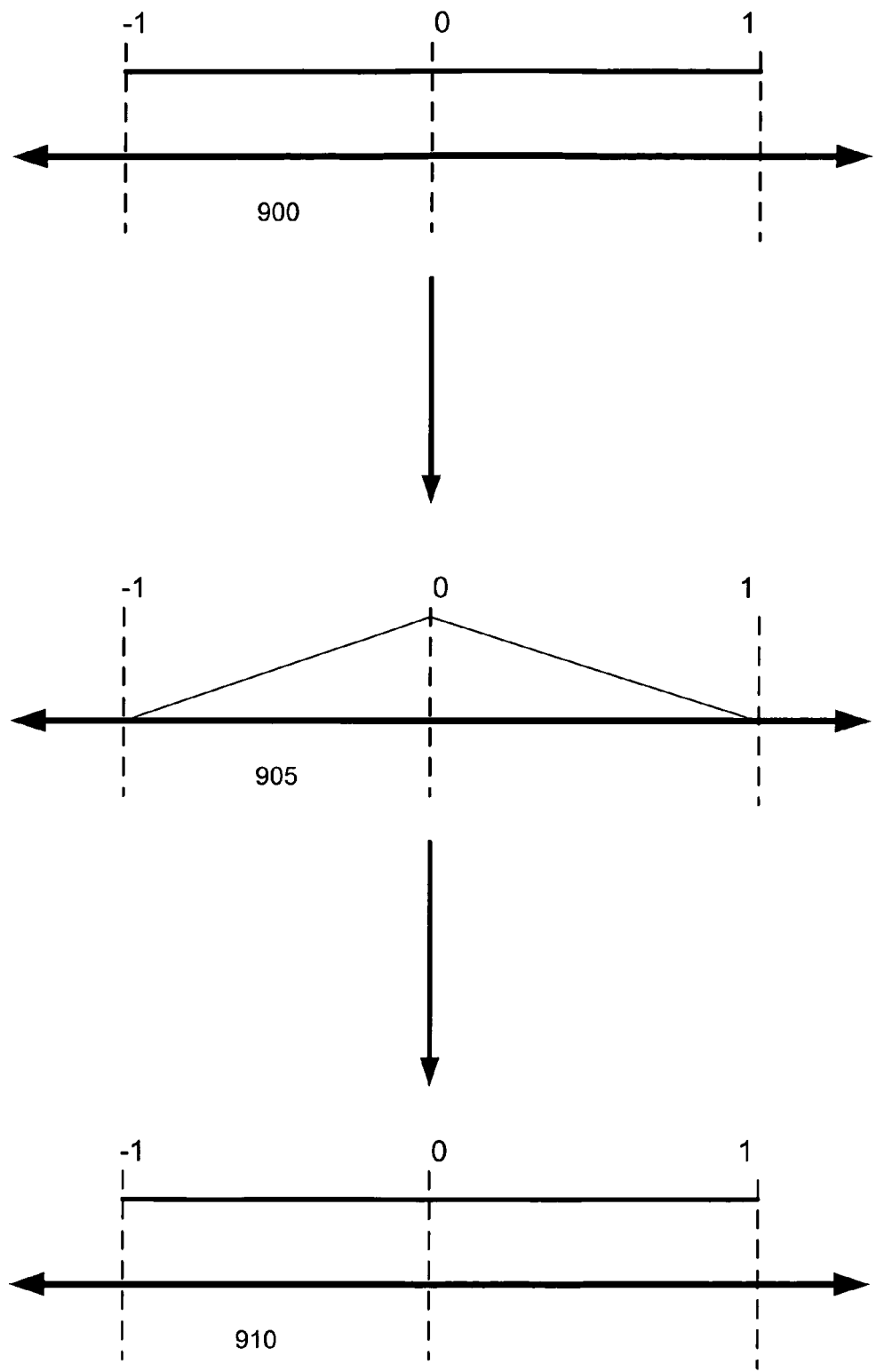
FIG. 9 illustrates a set of distributions for a noise octave, a noise set, and a corrected noise set according to an embodiment of the invention.

FIG. 9 illustrates a set of distributions for a noise octave, a noise set, and a corrected noise set according to an embodiment of the invention. Distribution 900 is an example output distribution of a random function. In this example, the distribution is flat, indicating that function has a equal probability of outputting any value between −1 and 1. If two functions having distributions such as distribution 900 are averaged, the resulting function has a distribution 905. As can be seen in distribution 905, the function has a high probability of outputting values around 0 and a very low probability of outputting values near −1 or 1.

For example, consider if the first distribution 900 has only ten discrete values (0.05, 0.15, 0.25, 0.35, 0.45, 0.55, 0.65, 0.75, 0.85, and 0.95). This distribution has a 10% probability of having a value between 0 and 0.1. If two functions with distribution 900 are averaged, then according to the resulting distribution 905, the probability of having a value between 0 and 0.1 substantially reduced. There is only a 1% chance that both functions have a value of 0.5 (10% times 10%), and only a 2% chance that one function has a value of 0.5 and the other function has a value of 0.15. The combined probability of the function with distribution 905 having a value between 0 and 0.1 is thus 3%, which is substantially less than the 10% probability in distribution 900.

An embodiment of the invention performs a distribution correction phase after combining two or more noise octaves as described above. In an embodiment, a distribution is associated with each noise octave. The distribution can be determined by analyzing each noise octave. As a result, the distribution correction phase can determine the distribution of the combined noise function.

In the embodiments described above, the creation of bandlimited noise octaves from unfiltered set of noise data involves sequences of linear operations on the data. If the unfiltered set of noise data follows a Gaussian distribution of one or more random variables, then the bandlimited noise octaves will also be a Gaussian random variable.

One technique for determining the distribution of the combined noise function begins by representing noise values from bandlimited noise octaves as linear combinations of the unfiltered noise data. Given a set of K unfiltered noise values x, a bandlimited noise octave N can be represented as:

$$N = \sum_{i=1}^{K} w_i x_i.$$

This bandlimited noise octave N has a variance $\sigma_N^2$, which can be expressed in terms of the variance $\sigma_x^2$ of the set of K unfiltered noise values x as $$\sigma_N^2 = \sigma_x^2 \sum_{i=1}^{K} w_i^2.$$

The set of weights $w_i$ are derived from the operations used to create the bandlimited noise octave from unfiltered noise data, such as the forward and reverse transformations of method 400 or the downsampling, upsampling, and subtracting operations of method 450. In an embodiment, the variance $\sigma_N^2$ can be determined analytically using the set of weights $w_i$ and the variance $\sigma_x^2$ of the unfiltered noise set. In another embodiment, the variance $\sigma_N^2$ can be determined numerically by analyzing the noise octave using typical statistical analysis techniques known in the art.

As described above, when two or more noise octaves are combined to form a set of bandlimited noise, the variance of the combined bandlimited noise set changes further. Once the distribution of the noise function is determined, a distribution correction can be applied to the noise function so that it has a desired distribution. The desired distribution can be a flat, white noise distribution, such as distribution 910, a Gaussian distribution, or any other arbitrary distribution. If the initial noise function has a Gaussian distribution, a new Gaussian distribution can be specified by scaling the variance of the initial noise function to the variance of the new Gaussian distribution. For a white distribution, an erf function can be used. Alternatively, a lookup table or other type of mapping can be used to create a noise function with any arbitrary distribution from an initial noise function.

In an embodiment, a user can specify the desired distribution, for example by inputting any arbitrary distribution function or by specifying desired statistical properties of the noise function, such as the mean and standard deviation. Thus, users can create a noise function that outputs ranges of values according to user-specified probabilities, thereby enabling precise control of the characteristics of input data for procedural data sets. In an embodiment, the distribution correction phase creates a mapping of values from the uncorrected noise function to values of the corrected noise function. The distribution correction phase applies this mapping to the noise function to create a corrected noise function with the desired distribution.

As discussed above, noise functions can be created from weighted combinations of different noise octaves. Typically, these weights are absolute and are assigned to a fixed spatial frequency range. In some applications, it is desirable to view an object or surface at a large range of scales. For example, an animation may begin with a view of an entire planet and then zoom in to show a single blade of grass. Because the weights associated with the noise functions and other data have an absolute weighting, if the zoom is centered on a relatively dark area of the noise function, the image will remain dark forever. As a result, the fine details are obscured.

In a further embodiment, the weights used to combine noise octaves can depend on the resolution scale or level of detail at which the noise function is viewed. These types of weights are referred to as relative weights. As the level of detail changes, for example as the viewer moves towards a given point of the noise function, these weights are changed dynamically. This enables lower frequency noise octaves to be gradually faded out as the camera zooms in, which enhances the visibility of the fine or high frequency detail. This effect approximates the adaptation of human visual perception to the average intensity of an image. In another embodiment, absolute weights that are independent of the resolution scale can be used to combine noise octaves. In still a further embodiment, both absolute and relative weights can be used to combine noise octaves.

Figure 10:
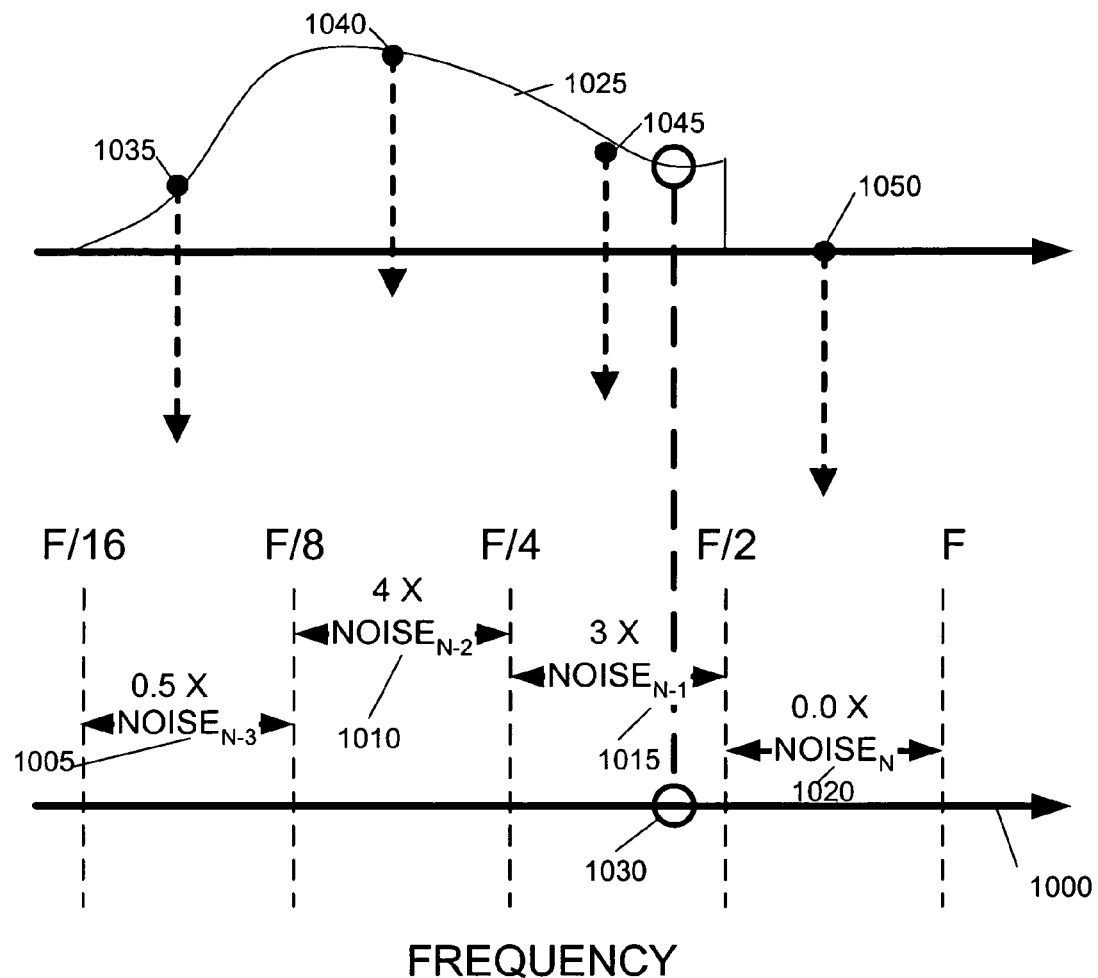
FIG. 10 illustrates an example application of relative noise octave weights used to control the characteristics of a noise set according to an embodiment of the invention.

FIG. 10 illustrates an example application of relative noise octave weights used to control the characteristics of a noise function according to an embodiment of the invention. A frequency spectrum 1000 includes noise octaves 1005, 1010, 1015, 1020. A relative weighting function 1025 is associated with the set of noise octaves. A center frequency 1030 is selected within the frequency spectrum 1000. The center frequency 1030 can vary according to the desired resolution scale or level of detail of the combined noise function. In an embodiment, the center frequency can be determined from a level of detail calculation, such as the size of a pixel or sub-pixel sample at a given viewing position projected on to the combined noise function in world space.

The position of the relative weighting function 1025 within the frequency spectrum 1000 is centered at the center frequency 1030. To determine the noise function at a given center frequency 1030, each noise octave is weighted according to the value of the relative weighting function 1025. For example, noise octave 1005 is weighted according to the value of the relative weighting function at point 1035. Similarly, the weights of noise octaves 1010, 1015, and 1020 are determined by the values of the relative weighting function 1025 at points 1040, 1045, and 1050, respectively. In an embodiment, the value of the relative weighting function 1025 is zero for all noise octaves above the center frequency 1030.

The noise octaves 1005, 1010, 1015, and 1020 are then combined according to their assigned weights. As the center frequency 1030 changes position within the frequency spectrum 1000, the relative weighting function 1025 changes position to follow the center frequency 1030. As a result, the weights associated with each noise octave change as the relative weighting function 1025 changes position.

In a further embodiment, the techniques described above for creating bandlimited noise octaves can be extended to combine attribute data sets from a variety of different sources. The attribute data sets can define geometry, for example expressed as displacement maps; and color, lighting, and shading attributes, for example expressed as texture, light, and shadow maps. The attribute data sets can be defined as the output of a procedure or defined explicitly, for example as an image created by an artist or other user.

Figure 11:
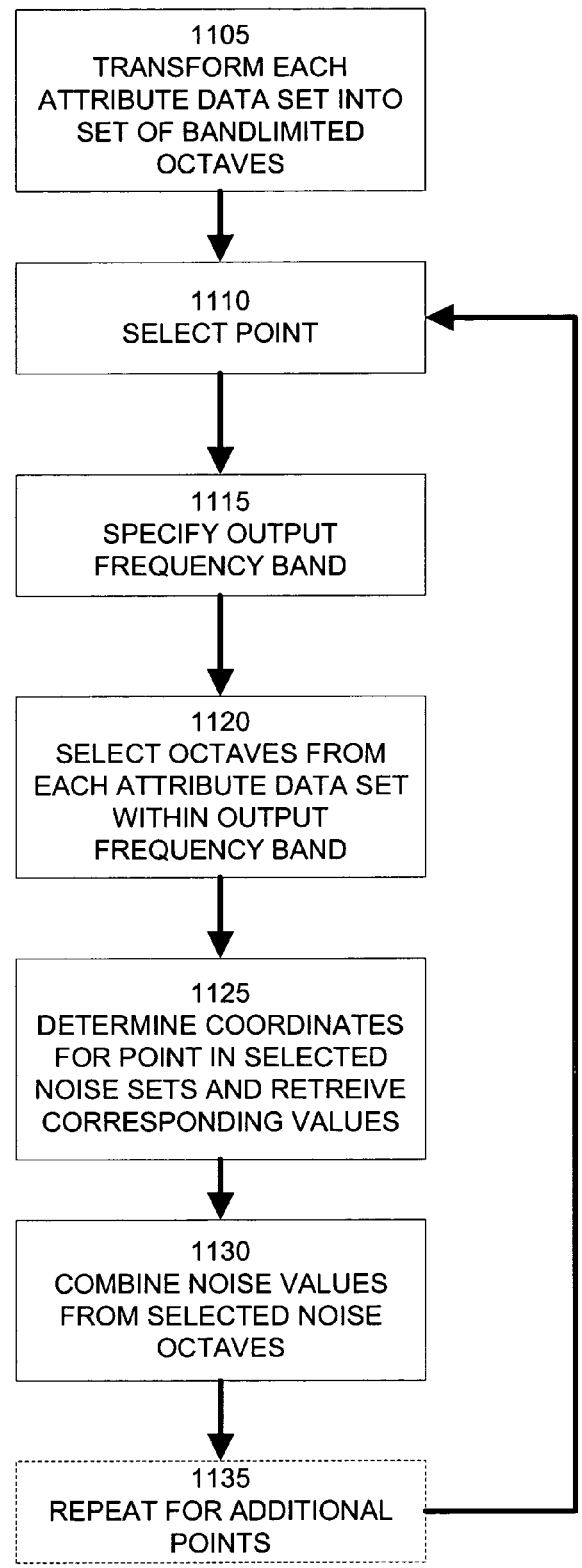
FIG. 11 illustrates a method for combining attribute data sets according to an embodiment of the invention.

FIG. 11 illustrates a method 1100 for combining attribute data sets according to an embodiment of the invention. Two or more attribute data sets to be combined are sent to method 1100. Step 1105 transforms each attribute data set into a set of bandlimited octaves, using techniques described above with reference to method 400 or method 700. In a further embodiment, either of these methods can be used depending upon the type of attribute data set. For example, if the attribute data set is described as a function including noise or other data as its input, then method 700 can be applied in step 1105 to reduce processing time. As method 700 determines the value of bandlimited octaves of noise or other data on demand, portions of method 700 will be used to determine the value of the attribute data set in step 1125, discussed below. For attribute data sets defined explicitly, method 400 can be used to determine bandlimited octaves for the entire attribute data set.

Step 1110 selects one or more points at which to evaluate the combination of the attribute data sets. In an embodiment, step 1110 selects points specified by a renderer that is rendering all or a part of an object associated with the attribute data sets.

At step 1115, an output frequency band is specified. In an embodiment, the output frequency band is specified by a renderer based upon size of pixel or sub-pixel samples projected onto the attribute data sets at a given point. When different points are rendered, or when the attribute data set changes position relative to the camera, the output frequency band will change accordingly.

Step 1120 selects the bandlimited octaves associated with each attribute data set, if any, that fall within the output frequency band. In some circumstances, an attribute data set may have no bandlimited octaves within the specified output frequency band. This may occur if an attribute data set specifies high frequency data that is above the output frequency band.

For each bandlimited octave selected in step 1120, step 1125 determines the coordinates corresponding to the selected point and retrieves the value of the attribute data set at that point.

Step 1130 combines the value from each of the selected bandlimited octaves into one or more combined values. In an embodiment, at least some of the attribute data sets associated with an object are combined according to a set of weights. Step 1130 combines the data from the selected bandlimited octaves in accordance with a set of weights associated with their corresponding attribute data sets. Because the data associated with each attribute data set may be represent different types of attributes, not all of the data is combined directly. For example, attribute data defining the geometry of an object would not be combined with attribute data representing color. However, if two or more attribute data sets include data of the same type, such as a procedural texture and a texture map both defining color data of an object, then step 1130 can combine data from selected noise octaves of these attribute data sets according their associated weights.

Optional step 1135 determines if there are any additional points to be evaluated in the attribute data sets. If so, then method 1100 returns to step 1110 to select the next point.

Figure 12:
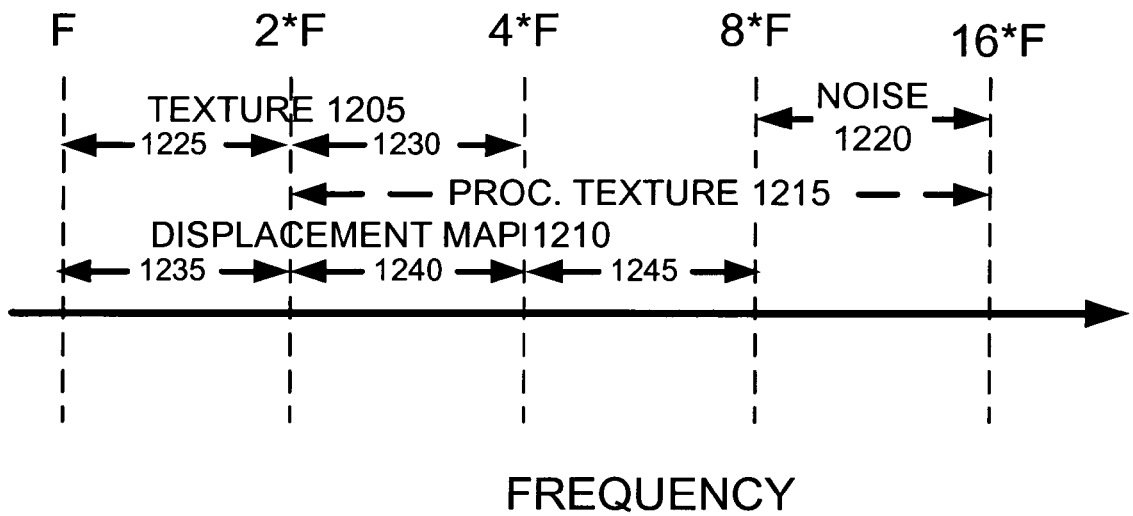
FIG. 12 illustrates a frequency spectrum of an example combination of attribute sets according to an embodiment of the invention.

FIG. 12 illustrates a frequency spectrum 1200 of an example combination of attribute data sets according to an embodiment of the invention. In this example, a texture map 1205, a displacement map 1210, a procedural texture 1215, and a noise function 1220 are associated with an object. Each of these attribute data sets is defined as one or more bandlimited octaves. For example, texture 1205 is represented by octaves 1225 and 1230. Displacement map 1210 is represented by octaves 1235, 1240, and 1245. Method 1100 determines an output frequency band for one or more points of an object and selects only the octaves of attribute data within this band. As a result, the attribute data sets associated with objects are always sampled correctly, without any artifacts from over-sampling or under-sampling.

Figure 13A:
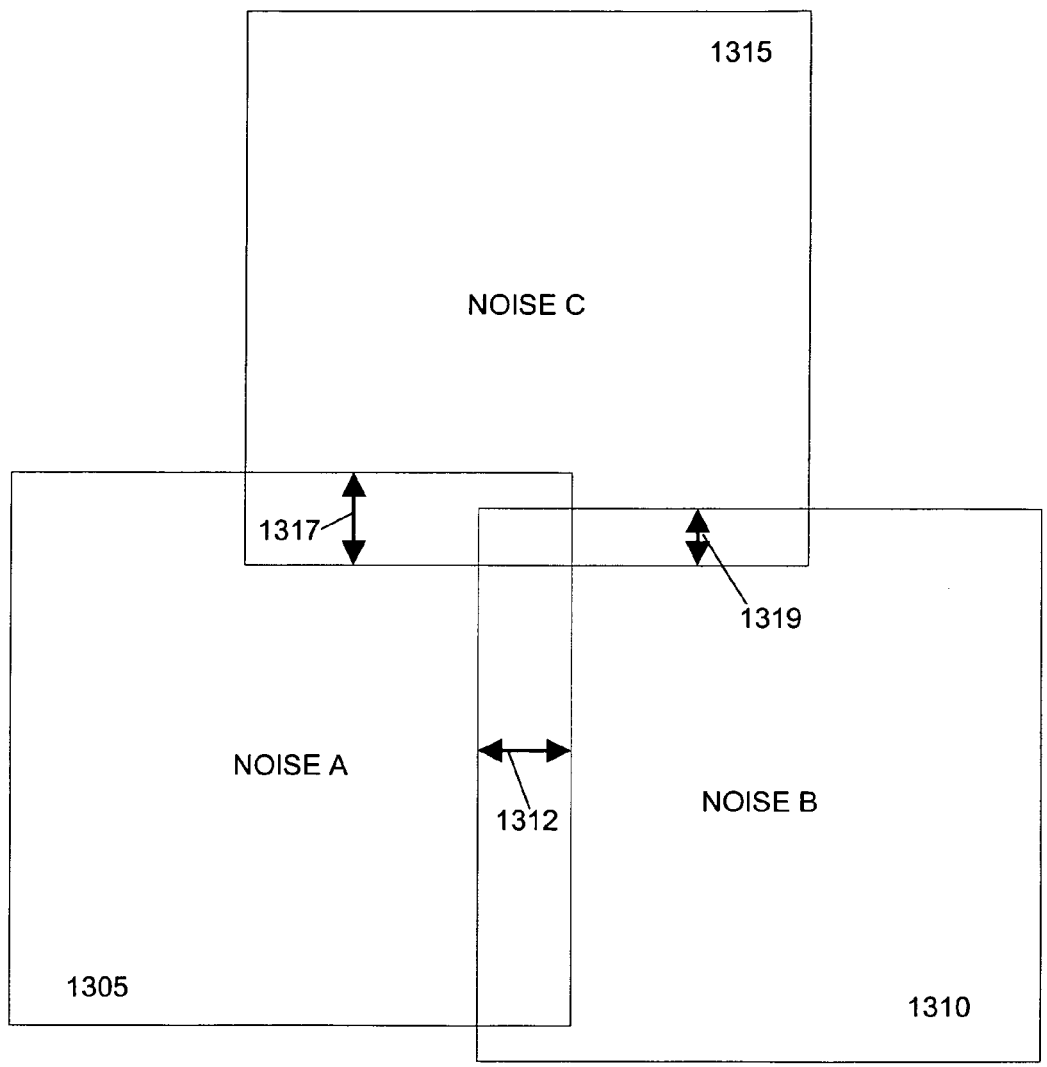
FIGS. 13A-13B illustrate arbitrary tiling of noise octaves and other data according to an embodiment of the invention.

As described above, precomputed noise tiles can be used to decrease evaluation time. One problem with using precomputed noise tiles is the appearance of regular patterns at tile boundaries. The embodiments of FIGS. 7 and 8 use out of phase combinations of noise tiles to hide these patterns. In another embodiment, noise tiles or other types of attribute data sets can be overlapped slightly and blended to hide tile boundaries. FIG. 13A illustrates an example 1300 of noise tiling according to an embodiment of the invention. In example 1300, three noise tile 1305, 1310, and 1315 arranged so that there is a slight overlap between the noise tiles. It should be noted that noise tiles 1305, 1310, and 1315 may be arranged either in a regular grid pattern or in an arbitrary and/or irregular positions.

Noise tiles 1305 and 1310 include an overlap region 1312. Similarly, noise tiles 1305 and 1315 include overlap region 1317 and noise tiles 1310 and 1315 include overlap region 1319. It should be noted that overlap regions 1312, 1317, and 1319 do not have to be the same size.

Blending operations are performed in each overlap region to hide tile boundaries. For example, the values of noise tiles 1305 and 1310 are blended in overlap region 1312. Embodiments of the invention can use any type of linear or non-linear blending technique to combine data from noise tiles in the overlap regions. Typically, blending techniques scale each value of a tile based at least in part on its relative location within the tile and decrease smoothly toward zero at the tile boundary to hide the tile boundary.

Although overlapping and blending noise tiles and other attribute data sets can hide tile boundaries, the blending operation reduces the statistical variance of the combined noise data, which in itself makes the tile boundaries visible. This appears as reduced contrast in the overlap regions along noise tile boundaries. For example, if at a given location in the overlap region, the value from a first noise tile is scaled by $\alpha$, the value from a second noise tile is scaled by $1-\alpha$, and then scaled values are combined to create a blended noise value, the variance of blended noise value at this location of the overlap region is reduced by a factor of $\alpha^2 + (1-\alpha)^2$.

An embodiment of the invention compensates for this reduced variance by scaling noise values in overlap regions by the inverse of the reduction in variance. For example, if two tiles overlap and the mean of noise values in noise tile is zero and if the noise value in an overlap region is scaled by $\alpha$ in one tile and by $1-\alpha$ in the other tile, then the noise value can be divided by the square root of $\alpha^2 + (1-\alpha)^2$ to compensate for the reduced variance. For non-zero mean noise values, the variance is adjusted by moving noise values in the overlap region closer to the mean by the square root of $\alpha^2 + (1-\alpha)^2$ Noise tiles of two or more dimensions can be blended in a similar manner. Normally, the weights of noise values from any number of different noise tiles overlapping at a location will sum to one. However, as discussed above, this results in a noise variance reduction that is typically the sum of the squares of the noise tile values' weights used to determine the combined noise value at that location. To compensate for the reduction in variance, an embodiment divides each noise tile's weight by the square root of the noise variance reduction. After correcting for the variance reduction, the sum of the weights of noise values for different noise tiles will not equal one; however, the variance of the combined noise value will be the same as the variance of the noise tiles.

Noise values can be scaled by $\alpha$ and variance compensation values at the time when noise values from two or more noise tiles are combined. In a further embodiment, if the pattern of tile overlaps are consistent so that $\alpha$ values for noise values in a noise tile are constant, then the noise values can be premultiplied by their appropriate variance compensation values and $\alpha$ values at the time of the noise tile is created, eliminating the need to perform this calculation later when noise tiles are combined.

Figure 13B:
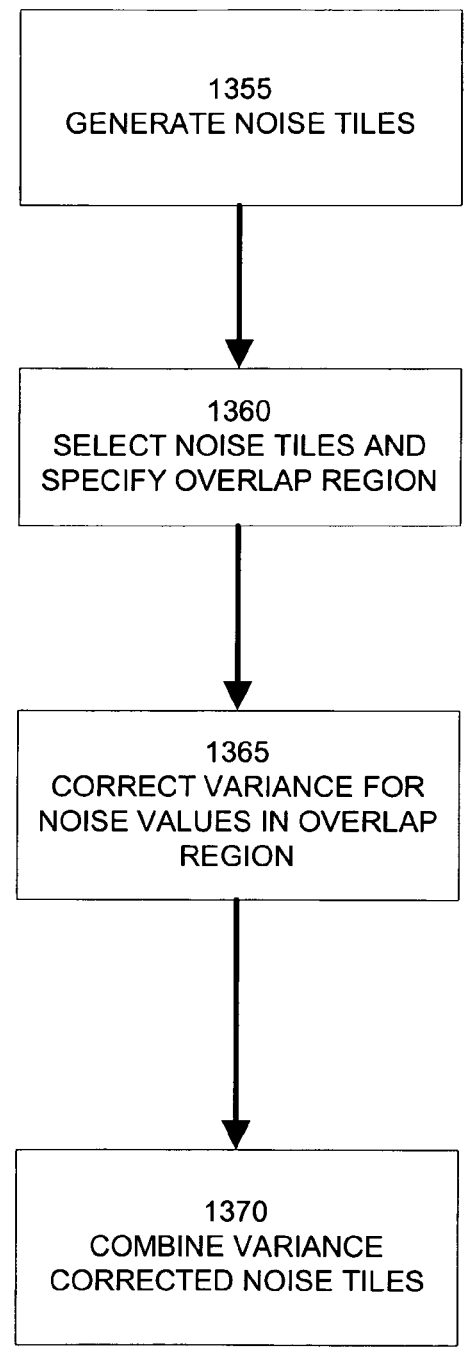

FIG. 13B illustrates a method 1350 of combining noise tiles. Step 1355 generates one or more bandlimited noise tiles as described above. Noise tiles can include bandlimited noise data in one, two, three, four, or more dimensions. Step 1355 may create many different noise tiles that can be combined. In an embodiment, step 1355 decreases memory requirements by only generating a single noise tile. To provide a variety of different noise patterns, step 1355 would typically use a set of different noise tiles selected with a hash function. If memory space is a concern, another embodiment creates variations of the single noise tile by permuting the indices of the noise tile (for example, swapping x, y, and z indices into a three-dimensional noise tile) and by stepping through the noise tile in forward or reverse order. From a single three-dimensional noise tile, step 1355 can derive 48 different variations of the noise tile. In another embodiment, techniques such as Wang tiles can tile space nonperiodically with fixed tile boundary pairs so the boundary matching can be precomputed.

Step 1360 selects two or more noise tiles (or variations of the same noise tile) to be combined. Step 1360 also determines the size and locations of overlap regions based on the positions of the noise tiles relative to each other.

Step 1365 corrects for the reduced variance in the overlap region caused by blending. As described above, the reduction in variance for noise values can be determined by the value to be used in blending. Step 1365 can then scale noise values to compensate for this reduction in variance. Embodiments of the invention can scale noise values to compensate for reductions in variance at the time the noise tile is created or at the time the blending operation is performed. Step 1370 then scales noise values according to their blending values and combines noise values from two or more noise tiles.

Typically, a renderer applies a filter kernel to turn a portion of a scene into a pixel value. If the scene at a position x is represented as a function $S(x)$, the value of a pixel i can be expressed as $$Pixel_i = \int S(x) K(x - i) dx,$$

where $K(x-i)$ is the renderer's filter kernel centered around pixel i. In the case of a bandlimited noise function, $S(x)$ includes $N(x)$, as defined above. Typically, renderers approximate this integral using quadrature, such as the weighted sum of discrete values of the scene function. In the case where the scene function $S(x)$ at position x is composed, at least in part, by a bandlimited noise function $N(x)$, this approximation can be expressed as $$Pixel_i \approx \sum_{q=1}^{Q} B_q N(x_q),$$

where Q is the number of samples evaluated by the renderer for each pixel and the quadrature weights $B_q$ corresponding to the renderer's filter kernel.

If the renderer evaluates a large number of samples of the bandlimited noise function $N(x)$ in the vicinity of a pixel (i.e. Q is relatively large), then the above expression $$Pixel_i \approx \sum_{q=1}^{Q} B_q N(x_q)$$

is a good approximation of the average value of the bandlimited noise function N(x) in the vicinity of the pixel. However, if the renderer's sampling rate is relatively low, then the expression $$Pixel_i \approx \sum_{q=1}^{Q} B_q N(x_q)$$

does not give a good approximation of the average value of the bandlimited noise function N(x) in the vicinity of the pixel. To compensate for the renderer's limitations noise function N(x) can be changed to $\tilde{N}(x_q)$. This can be expressed as $$Pixel_i \approx \sum_{q=1}^{Q} B_q \tilde{N}(x_q),$$

where $\tilde{N}(x_q)$ is a weighted average of N(x) in the vicinity of $x_q$.

In an embodiment, $\tilde{N}(x_q)$ is equal to the bandlimited noise coefficients $n_i$ times the convolution of the renderer's filter kernel with the noise function's scaling basis function. For example, if the noise function's scaling basis function and the renderer's filter kernel are both quadratic B-splines, then the result of this convolution will be a quintic function. For other types of scaling basis functions and/or renderer filter kernel's, different functions will result.

In yet a further embodiment, when both the noise function's scaling basis function and the renderer's filter kernel are quadratic B-splines, the quintic function in the $\tilde{N}(x_q)$ can be approximated by a widened version of the renderer's filter kernel function B(x) or the noise function's scaling basis function. For example, a widened version of a quadratic B-spline basis function $B(0.5(x-x_q))$ covers six noise coefficients and is a good approximation of the integral $Pixel_i = \int S(x)K(x-i)dx$ at the highest resolution of the noise set, if both the noise function's scaling basis function and the renderer's filter kernel are quadratic B-splines. For lower resolution levels of noise octaves, narrower versions of the quadratic B-spline basis function covering fewer noise coefficients can be used.

Figure 14A:
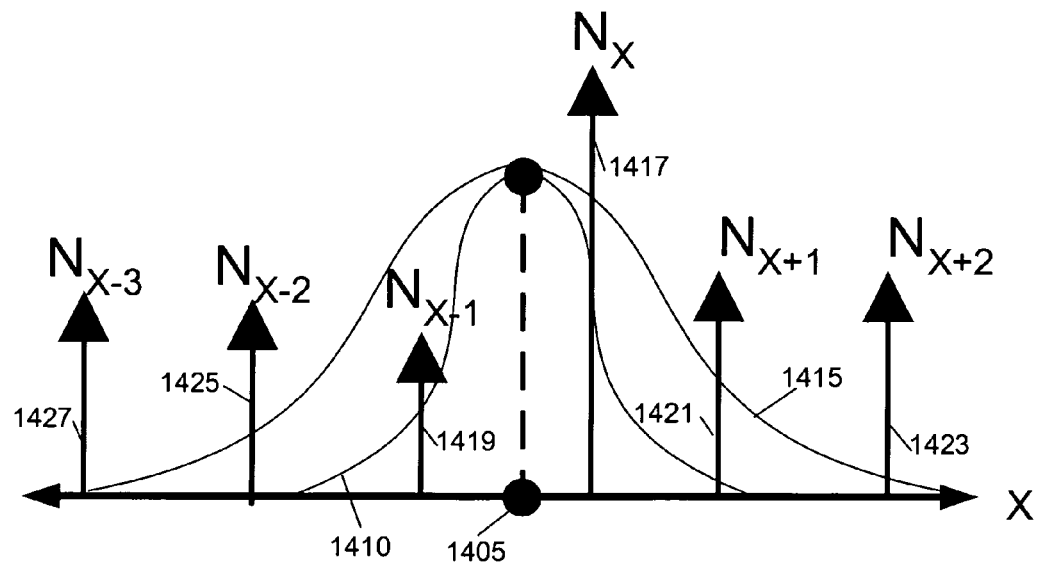
FIG. 14 illustrates an example approximation of the filter kernel used for typically rendering noise octaves according to an embodiment of the invention.

FIG. 14A illustrates an example application of the evaluation of a bandlimited noise function according to an embodiment of the invention. In this embodiment, point 1405 is the point of evaluation for the bandlimited noise function. A quadratic B-spline basis function 1410 is centered around point 1405. Quadratic B-spline basis function 1410 can be similar to the basis function used to express the bandlimited noise function or different weights that provides higher order accuracy can be used, such as a Gaussian quadrature weights.

Basis function 1410 covers three noise coefficients, 1417, 1419, and 1421. The value of the noise function at point 1405 is represented as the linear combination of noise coefficients 1417, 1419, and 1421, where each noise coefficient is scaled according to the value of the basis function 1410 at the location of the noise coefficient. For example, the value of the noise function at point 1405 is composed primarily of noise coefficient 1417, because the basis function 1410 is near its peak value at the location of noise coefficient 1417.

As discussed above, a widened version of a basis function can serve as a good approximation of the integral of a filter kernel applied to the noise function. In the example of FIG. 14A, a widened basis function 1415 centered at point 1405 is used to approximate the integral of the filter kernel applied to the noise function at point 1405. In an embodiment, widened basis function 1415 is a wider version of basis function 1410. In alternate embodiments, widened basis function 1415 is a wider version of a different type of basis function. Widened basis function 1415 covers six noise coefficients. In addition to noise coefficients 1417, 1419, and 1421, the widened basis function 1415 also covers noise coefficients 1423, 1425, and 1427. Thus, the value of the integral centered at point 1405 can be approximated by the linear combination of noise coefficients 1417, 1419, 1421, 1423, 1425, and 1427, with each noise coefficient weighted by the value of the widened basis function 1415 at the location of the noise coefficient.

As discussed in detail below, when the noise coefficients are part of an octave of bandlimited noise data, the contribution of other noise coefficients located outside of the widened basis function 1415 to the value of the filter kernel integral at point 1405 is negligible or zero. Thus, the frequency spectrum of bandlimited noise data diminishes at the same or similar rate as the filter kernel, such that the bandlimited noise data is negligible or zero at the point of aliasing.

Figure 14B:
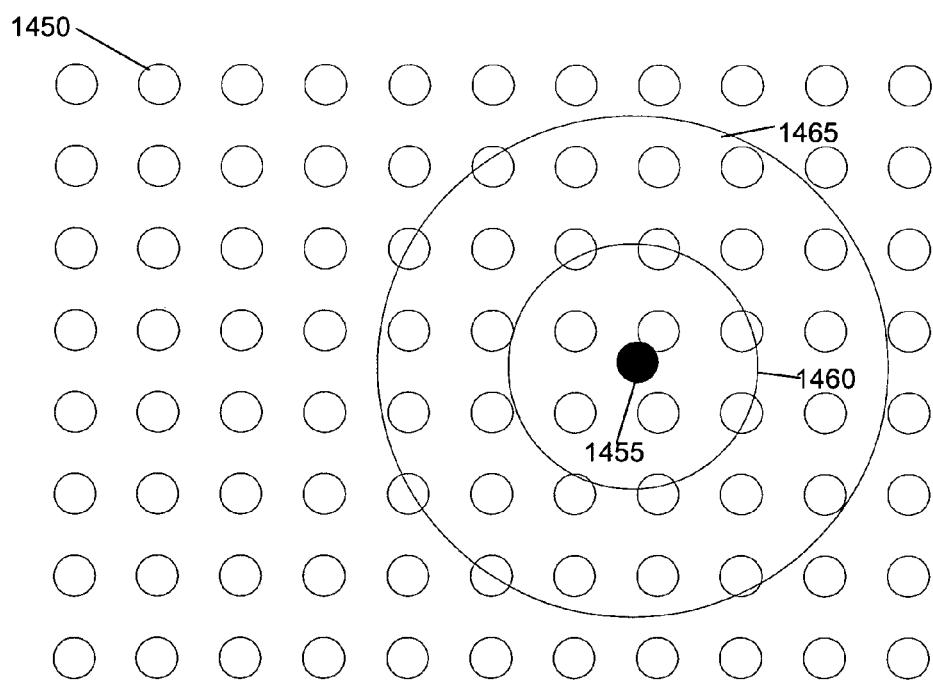

In an embodiment, the use of a widened basis function to approximate an integral of noise coefficients around a point can be extended to two, three, four, or more dimensions. FIG. 14B illustrates an example application of the evaluation of a bandlimited noise function according to an embodiment of the invention. In this example, a two-dimensional set of noise coefficients 1450 is illustrated. A point 1455 is selected as the point of evaluation. The value of the noise function at point 1455 can be determined by applying a basis function in two dimensions, such as a quadratic B-spline basis function, centered around point 1455 to the set of noise coefficients 1450. Boundary 1460 represents the boundary of a two-dimensional basis function similar to basis function 1410 discussed above, but extended to higher dimensions.

Similarly, the integral of noise coefficients around point 1455 can be approximated by a wider version of a basis function. Boundary 1465 represents the boundary of a two-dimensional widened basis function similar to basis function 1415 discussed above, but extended to higher dimensions.

In one application of noise functions, noise functions are used as input data for creating procedural data sets. For example, a three-dimensional set of noise data is used to create a procedural texture map for a three-dimensional volume, such as a cloud. In many applications, such as applying a texture map to the surface of a three-dimensional object, the set of noise data is sliced or divided into a lower dimensional set of noise data.

Figure 15A:
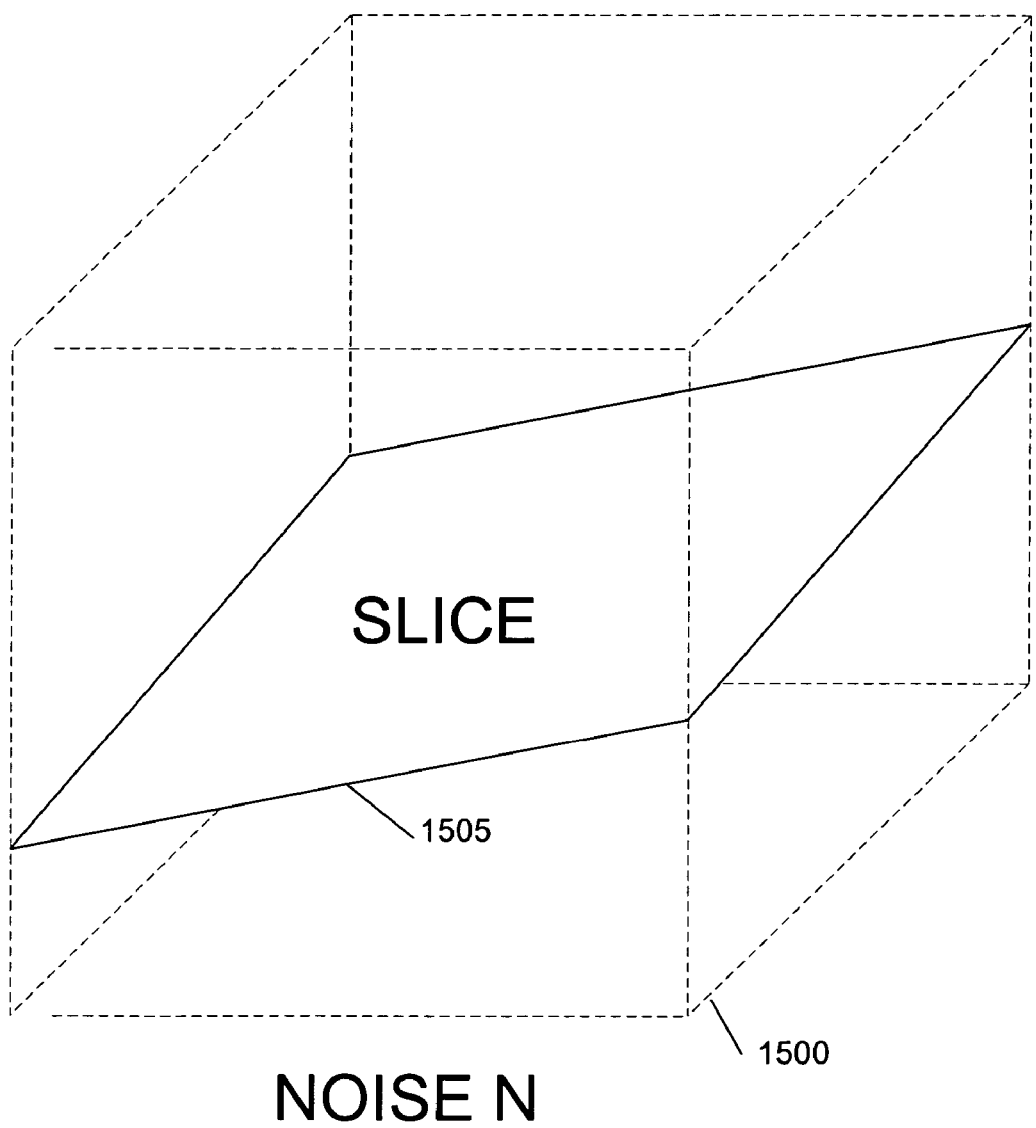
FIGS. 15A-15B illustrate an example slicing a noise data and the problems associated with the same according to a prior technique.

For example, a two-dimensional plane or slice of noise data may be extracted from a three or more dimensional set of noise. FIG. 15A illustrates an example noise set 1500 of three dimensions from which a two-dimensional slice 1505 of noise data is extracted. The two-dimensional slice 1505 can be used as input data for creating procedural data sets, such as procedurally generated texture maps. In some applications, the two-dimensional slice 1505 is coincident with a surface of a three-dimensional model to which the procedural data set will be applied.

As discussed above, bandlimited noise sets are useful in preventing aliasing or blurring artifacts. Unfortunately, it has been observed that a lower-dimensional slice of noise data extracted from a higher dimensional set of bandlimited noise data is not bandlimited. If example noise set 1500 is a bandlimited noise set, created as described above, two-dimensional slice 1505 will not be bandlimited.

Figure 15B:
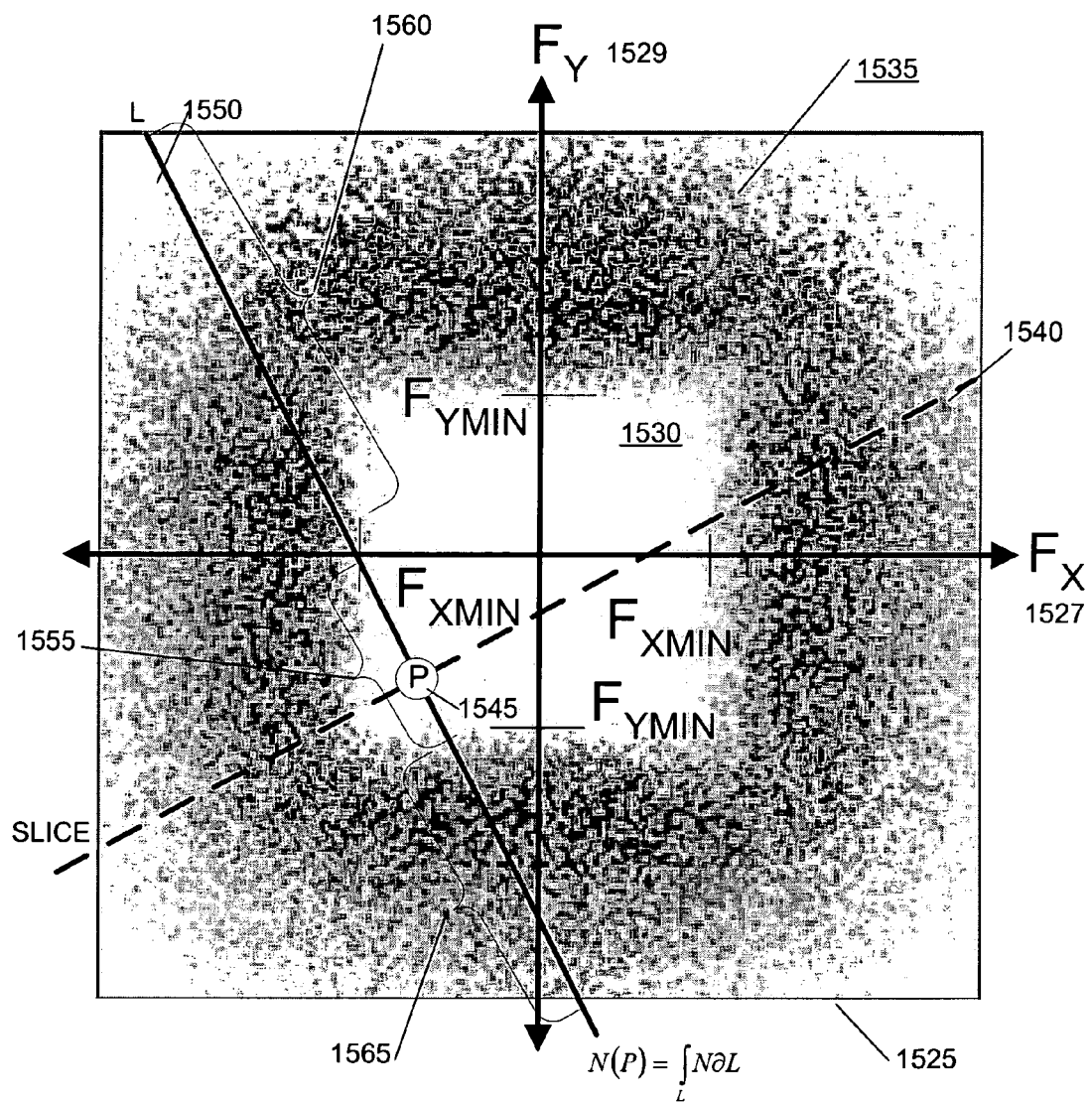

FIG. 15B illustrates the reason why slices of bandlimited noise data are not bandlimited as well. FIG. 15B illustrates the Fourier transform 1525 of an example bandlimited noise set. For clarity, this example is for a one-dimensional slice through two-dimensional data. Fourier transform 1525 illustrates the frequency components of the bandlimited noise set in the X direction 1527 and the Y direction 1529.

In FIG. 15B, the darker regions indicate greater magnitudes for frequency components while the white regions indicate a zero or negligible magnitude for frequency components. As can be seen from the Fourier transform 1525, the center region 1530 has almost no spectral energy. This is the result of the noise set being bandlimited so that the frequency components below a minimum frequency are negligible; in this example those minimums are $Fmin_X$ and $Fmin_Y$.

FIG. 15B also illustrates the Fourier transform of a slice 1540 of the bandlimited noise set, analogous to as slice 1505 discussed above. According to the Fourier slice theorem, the value of any point of the Fourier transform of the slice 1540 is equal to the integral of the noise set on a line perpendicular to the slice and passing through the point.

For example, the value of the Fourier transform of the slice 1540 at point P 1545 is equal to the integral of the Fourier transform of the noise set 1525 along line 1550. If slice 1540 were bandlimited, then the value of its Fourier transform at point P 1545, which lies in region 1530, would be zero. However, according to the Fourier slice theorem, the value of the Fourier transform of slice 1540 at point P 1545 is the integral of the Fourier transform of the bandlimited noise set 1525 along line 1550. Line 1550 includes segment 1555, in which the value of Fourier transform 1525 is equal to zero. Unfortunately, line 1550 also includes two segments, 1560 and 1565, in which the value of Fourier transform 1525 is not zero. As a result of the contributions of segments 1560 and 1565 to this integral along line 1550, the value of the Fourier transform of slice 1540 at point P 1545 will not be zero. Thus, slice 1540 is not bandlimited.

Embodiments of the invention exploit the orthogonality property of the wavelet noise to create bandlimited slices of noise data from higher dimensional bandlimited noise sets. An embodiment of the invention defines the value of noise data in a slice of A dimensions as the projection of the noise set of B dimensions on to the basis functions of A dimensions, where B is greater than A. For example, in a planar slice aligned with an axis of the noise data set, such that the slice has a plane equation $2^j z = z_0$, the value of noise data at a point on the planar slice is defined as $$\text{Noise}_{z_0}(2^j x, 2^j y) := \int \text{Noise}_N(2^j x, 2^j y, 2^j z) \phi(z - z_0) dz.$$

The projection of noise data from a bandlimited noise set onto the basis functions of a lower dimensional slice is equivalent to performing a (B-A) dimensional area integral orthogonal to the slice, where the integrand is the noise data weighted by a scaling function, $\phi(z)$, centered at the point of intersection. In another embodiment, the (B-A) dimensional area can be integrated as a sequence of line integrals or other lower dimensional area integrations. The scaling function $\phi(z)$ can be a piecewise constant scaling functions, such as Haar basis functions; piecewise polynomial scaling functions, such as uniform B-spline basis functions of any degree; bandlimited scaling functions, such as sinc functions; and Daubeschies scaling functions.

This definition of the value of a point of a slice of a bandlimited noise function guarantees that the slice will be orthogonal to lower resolution versions of itself. As a result, the slice of bandlimited noise data will be also be bandlimited.

In a further embodiment, the value of the integral used for projection of noise data onto a lower dimensional slice can be approximated using the quadrature techniques discussed above. In this application, the integral of the bandlimited noise function times the scaling function $\phi(z)$ can be approximated as the sum of the bandlimited noise function times the convolution of the noise function's scaling basis function with itself. In the example of bandlimited noise function using a quadratic B-spline scaling basis function, this convolution results in a quintic function. In yet a further embodiment, the quintic function can be approximated as a widened version of the quadratic B-spline scaling basis function, similar to that described in FIGS. 14A and 14B. In this embodiment, the integral is approximated using a widened quadratic B-spline basis function as the filter kernel in the normal direction of the slice. In an embodiment, the widened quadratic B-spline basis function has twice the width of the unwidened version In an embodiment, the filter kernel in the tangent direction of the slice is unchanged in form and characteristics used to evaluate the bandlimited noise function. For example, the renderer's filter kernel can be used to evaluate the noise function in the tangent direction. In another example, the approximation $$\sum_{q=1}^{Q} B_q \tilde{N}(x_q)$$

discussed above can be used to evaluate the noise function in the tangent direction and compensate for the renderer's low sampling rate. In still another example, if $\tilde{N}(x_q)$ includes a quintic function, resulting from the use of quadratic B-splines for the renderer filter kernel and the noise function scaling basis functions, then this quintic can be further approximated as a widened version of the quadratic B-spline basis function.

Figure 16:
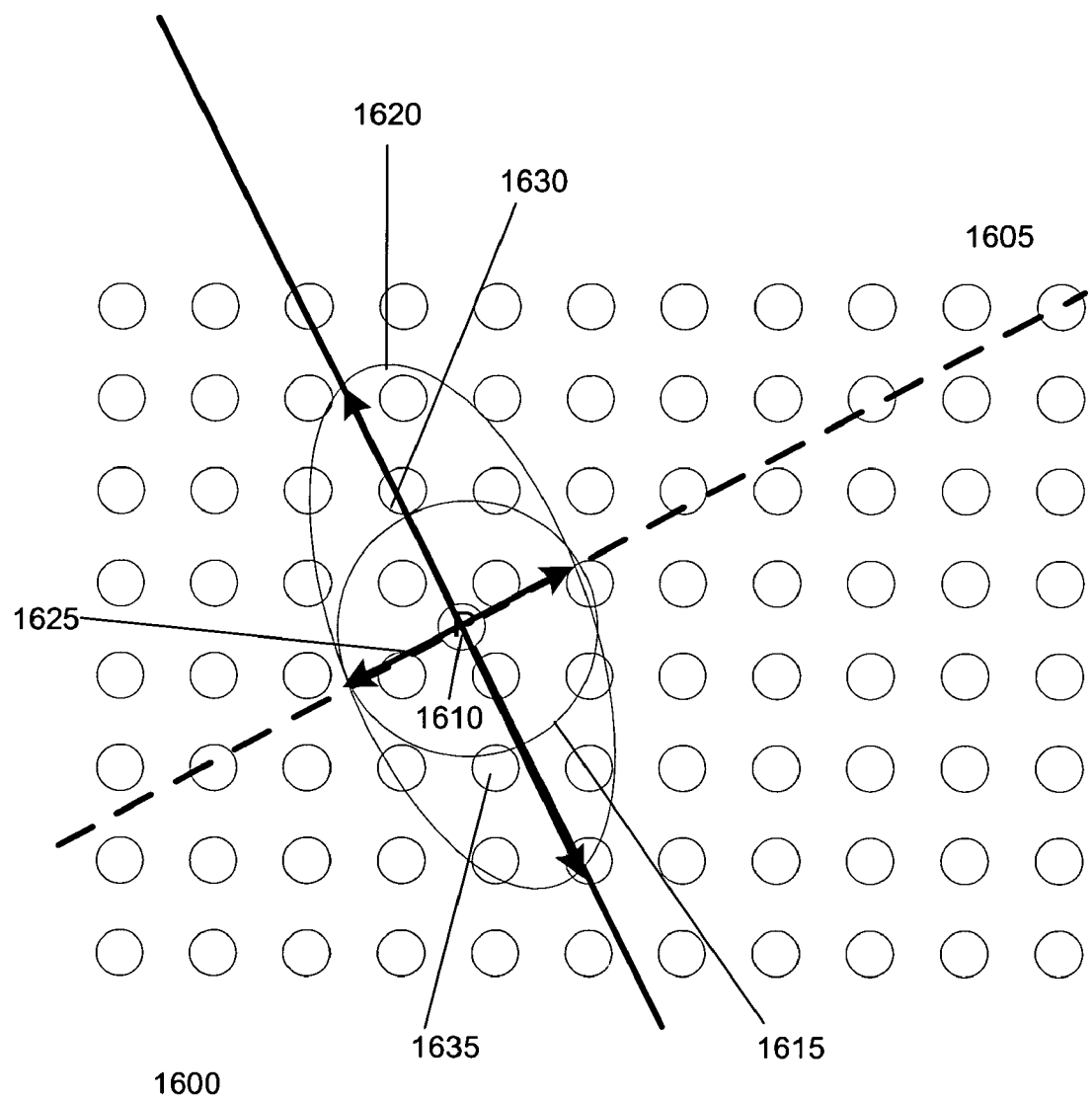
FIG. 16 illustrates an example application of creating a bandlimited slice of data from a higher dimensional set of data according to an embodiment of the invention.

FIG. 16 illustrates a bandlimited noise set 1600 including discrete noise coefficients and a slice 1605 to be extracted. The value of the noise slice 1605 at point P 1610 is determined using a projection of the noise data onto the basis functions of the lower-dimensional slice, as described above. In this example, the value of this projection at point P 1610 is determined from the linear combination of noise coefficients near point P 1610 that are weighted by the value of filter kernel 1620 at the location of each noise coefficient. In this example, the filter kernel 1620 is composed of a quadratic B-spline basis function of usual width in the tangent direction 1625 and a quadratic B-spline basis function of double width in the normal direction 1630. At the location of each noise coefficient, such as noise coefficient 1635, interpolation of the filter kernel is used to define a weight to be applied to the noise coefficient value.

Because of the orthogonality properties of wavelet basis functions, such as the Haar basis or the quadratic B-spline basis, the contribution of noise coefficients outside of the filter kernel 1620 are zero or negligible. The widened basis function in the normal direction integrates noise data at the same frequency scale at which the bandlimited noise disappears, due to its bandlimited nature.

The projection of noise data onto a slice is axis-aligned. A common application of this axis-aligned projection is the projection of a four dimensional bandlimited noise set (indexed by x,y,z, and time) onto a three dimensional slice (x,y,z). In this application, the projection is aligned with the time axis. In other applications, such as the above example, the projection may not be axis-aligned. For non-axis-aligned projections and non-integer resolution levels, the deviation from orthogonality is often negligible.

In these applications, the normal and tangent vectors of a point in a slice of noise data may be derived from derivatives of an associated surface. In other applications, normal and tangent vectors can be assigned to a point in a slice of noise data using other techniques, such as when the point is not associated with a differentiable surface.

It should be noted that the above described noise functions can be incorporated into any rendering technique, for example ray-tracing or scanline rendering, to create one or more images or frames using noise functions in combination with models, lighting, shading, texture mapping, and any other image processing information. Additionally, the above described noise functions can be created and utilized in functions and programs implemented in any type of general purpose programming language, such as C, as well as rendering and shading specific languages, such as the Renderman shading language.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of forming a computer generated image that includes characteristic information of pixels, wherein the characteristic information of at least a portion of the pixels is determined at least in part by sampling noise data defined by a scene including a three-dimensional model of an object, the method comprising:
    creating first noise data using a processor;
    constraining the first noise data using a processor such that the first noise data has a frequency spectrum contained substantially between first and second frequency values;
    wherein a sum of the frequency spectrum of the first noise data and a copy of the frequency spectrum of the first noise data is substantially flat, wherein the copy of the frequency spectrum is translated in frequency by the difference between the first and second frequency values
    wherein the frequency spectrum of the first noise data diminishes abruptly outside of a range between the first and second frequency values, wherein the frequency spectrum of the first noise data diminishes from a significant magnitude to approximately zero within a power of two from the first and second frequency values.

2. The method of claim 1, wherein the first noise data is comprised of a linear combination of a first set of locally supported scaling basis functions.

3. The method of claim 1, wherein the first noise data lacks a discernable pattern.

4. The method claim 3, wherein the first noise data is randomly generated.

5. The method of claim 3, wherein the first noise data is pseudo-randomly generated.

6. The method of claim 1, further comprising:
    creating second noise data having a frequency spectrum contained substantially between third and fourth frequency values; and
    combining the first noise data and the second noise data.

7. The method of claim 6, wherein creating the second noise data comprises:
    scaling the first noise data to a first resolution to form a scaled noise data, wherein the first resolution corresponds to the third frequency; and
    setting the second noise data to the scaled noise data.

8. The method of claim 6, wherein creating the second noise data comprises:
    creating second noise data; and
    constraining the second noise data such that a frequency domain transform of the second noise data produces a frequency spectrum contained substantially between the third and the fourth frequency values.

9. The method of claim 6, wherein the first noise data is comprised of a linear combination of a first set of scaling basis functions defining a first vector space and the second noise data is comprised of a linear combination of a second set of scaling basis functions defining a second vector space, wherein the second vector space is included in the first vector space.

10. The method of claim 9, wherein the first set of scaling basis functions is orthogonal to the second set of scaling basis functions, such that such that every vector in the second vector space can be represented in the first vector space and at least one vector in the first vector space cannot be represented in the second vector space.

11. The method of claim 1, wherein the second frequency value is an integer multiple of the first frequency value.

12. The method of claim 11, wherein the integer multiple is two.

13. A method of forming a computer generated image that includes characteristic information of pixels, the method comprising:
    creating noise data using a processor;
    using a processor, specifying a filter kernel adapted to sample scene data including a contribution of the noise data to determine the characteristic information of at least a portion of the pixels of the computer generated image; and
constraining the noise data such the contribution of the noise data diminishes substantially at an aliasing frequency,
    wherein the filter kernel is adapted to approximate a renderer filter kernel, wherein the filter kernel is based on a convolution of the renderer filter kernel and a scaling basis function of the noise data, and wherein the filter kernel is a widened version of the scaling basis function adapted to approximate the convolution.

14. The method of claim 13, wherein the filter kernel is adapted to be used by a renderer.

15. The method of claim 13, wherein the noise data is comprised of a linear combination of locally supported scaling basis functions.

16. The method of claim 13, further comprising:
    constraining the noise data such that the contribution of the noise data diminishes substantially at a minimum frequency.

17. The method of claim 16, wherein the aliasing frequency is an integer multiple of the minimum frequency.

18. The method of claim 17, wherein the integer multiple is two.

* * * * *